(12) United States Patent
Yoon et al.

(10) Patent No.: US 10,304,352 B2
(45) Date of Patent: May 28, 2019

(54) ELECTRONIC DEVICE AND METHOD FOR SHARING IMAGE

(71) Applicant: Samsung Electronics Co., Ltd., Gyeonggi-do (KR)

(72) Inventors: Su-Ha Yoon, Seoul (KR); Eun-Seok Ryu, Seoul (KR); Eui-Chang Jung, Seoul (KR); Young-Keun Choi, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 256 days.

(21) Appl. No.: 15/216,796

(22) Filed: Jul. 22, 2016

(65) Prior Publication Data

US 2017/0032207 A1 Feb. 2, 2017

(30) Foreign Application Priority Data

Jul. 27, 2015 (KR) .................. 10-2015-0105721

(51) Int. Cl.
| | |
|---|---|
| *G06K 9/00* | (2006.01) |
| *G09B 19/00* | (2006.01) |
| *H04N 21/4223* | (2011.01) |
| *H04N 21/44* | (2011.01) |
| *H04N 21/431* | (2011.01) |
| *H04N 21/81* | (2011.01) |
| *H04N 5/77* | (2006.01) |
| *G09B 5/06* | (2006.01) |

(52) U.S. Cl.
CPC ............. *G09B 19/003* (2013.01); *G09B 5/06* (2013.01); *H04N 5/77* (2013.01); *H04N 21/4223* (2013.01); *H04N 21/4312* (2013.01); *H04N 21/4316* (2013.01); *H04N 21/44008* (2013.01); *H04N 21/8133* (2013.01)

(58) Field of Classification Search
CPC . G09B 19/03; G09B 5/06; H04N 5/77; H04N 21/8133; H04N 21/4316; H04N 21/4223; H04N 21/4312; H04N 21/44008
See application file for complete search history.

(56) References Cited

U.S. PATENT DOCUMENTS

| | | | | |
|---|---|---|---|---|
| 9,521,328 | B2* | 12/2016 | Kim ..................... | H04N 13/344 |
| 9,581,431 | B1* | 2/2017 | Sieracki | |
| 9,830,525 | B1* | 11/2017 | Sieracki ............... | G06K 9/4604 |
| 2005/0195274 | A1 | 9/2005 | AbiEzzi et al. | |
| 2006/0010697 | A1* | 1/2006 | Sieracki ................... | G01C 3/04 |
| | | | | 33/267 |
| 2006/0146142 | A1* | 7/2006 | Arisawa ................. | G01C 11/06 |
| | | | | 348/211.11 |

(Continued)

*Primary Examiner* — Aaron W Carter
(74) *Attorney, Agent, or Firm* — Cha & Reiter, LLC.

(57) ABSTRACT

An electronic device, comprising: a memory; at least one processor operatively coupled to the memory, configured to: receive a first image or metadata corresponding to the first image from an external electronic device; capture a second image by using a camera; detect a change of a first region of interest of the first image; change a second region of interest of the second image based on the change of the first region of interest; and display the second region of interest on a display, wherein displaying the second region of interest includes a displaying at least a portion of the second image that corresponds to the second region of interest.

20 Claims, 15 Drawing Sheets

(56) References Cited

U.S. PATENT DOCUMENTS

| | | | |
|---|---|---|---|
| 2007/0088817 A1 | 4/2007 | Li | |
| 2007/0200953 A1* | 8/2007 | Liu | H04N 5/45 348/561 |
| 2007/0294346 A1 | 12/2007 | Moore et al. | |
| 2007/0299912 A1 | 12/2007 | Sharma et al. | |
| 2008/0030515 A1* | 2/2008 | Kwon | G06K 9/00718 345/531 |
| 2010/0149301 A1 | 6/2010 | Lee et al. | |
| 2010/0150451 A1* | 6/2010 | Chae | G06T 7/70 382/199 |
| 2010/0157020 A1* | 6/2010 | Choi | H04N 5/232 348/47 |
| 2010/0214419 A1 | 8/2010 | Kaheel et al. | |
| 2010/0245532 A1* | 9/2010 | Kurtz | G06K 9/00711 348/14.03 |
| 2010/0329358 A1 | 12/2010 | Zhang et al. | |
| 2011/0025816 A1 | 2/2011 | Brewer et al. | |
| 2012/0162264 A1* | 6/2012 | Hughes | G06T 11/00 345/660 |
| 2012/0213407 A1* | 8/2012 | Haikin | G06F 17/30247 382/103 |
| 2012/0244847 A1 | 9/2012 | Chandra et al. | |
| 2013/0067116 A1 | 3/2013 | Ostergren | |
| 2013/0110971 A1 | 5/2013 | Williams et al. | |
| 2013/0142086 A1 | 6/2013 | Hiie et al. | |
| 2013/0182119 A1* | 7/2013 | Eledath | G06K 9/209 348/159 |
| 2014/0063174 A1 | 3/2014 | Junuzovic et al. | |
| 2014/0168358 A1* | 6/2014 | Gong | H04N 5/23206 348/39 |
| 2015/0161441 A1* | 6/2015 | Robinson | G06K 9/00791 382/113 |
| 2016/0225158 A1* | 8/2016 | Tsubota | G06K 9/4671 |
| 2016/0309095 A1* | 10/2016 | Laroia | H04N 5/247 |
| 2017/0019594 A1* | 1/2017 | Wu | H04N 5/23238 |
| 2017/0032207 A1* | 2/2017 | Yoon | H04N 21/4223 |
| 2017/0076468 A1* | 3/2017 | Krauss | G06T 7/2093 |
| 2017/0200052 A1* | 7/2017 | Carey | G06K 9/00778 |
| 2017/0208257 A1* | 7/2017 | Laroia | H04N 5/23296 |
| 2017/0208295 A1* | 7/2017 | George | H04N 7/188 |
| 2017/0341775 A1* | 11/2017 | Liu | B64D 45/08 |
| 2018/0103218 A1 | 4/2018 | Stein | H04N 5/247 |
| 2018/0324410 A1* | 11/2018 | Roine | G06T 3/4038 |

\* cited by examiner

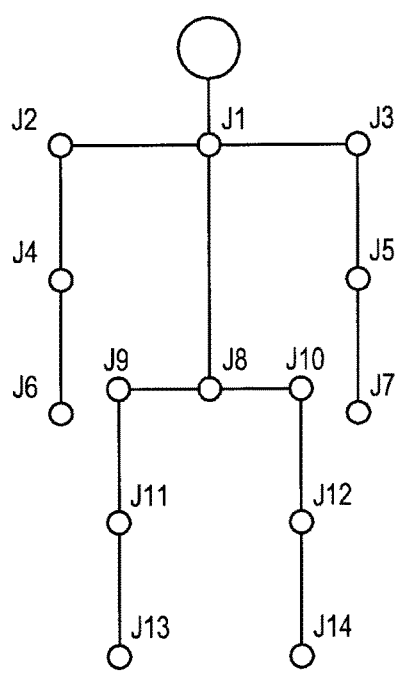 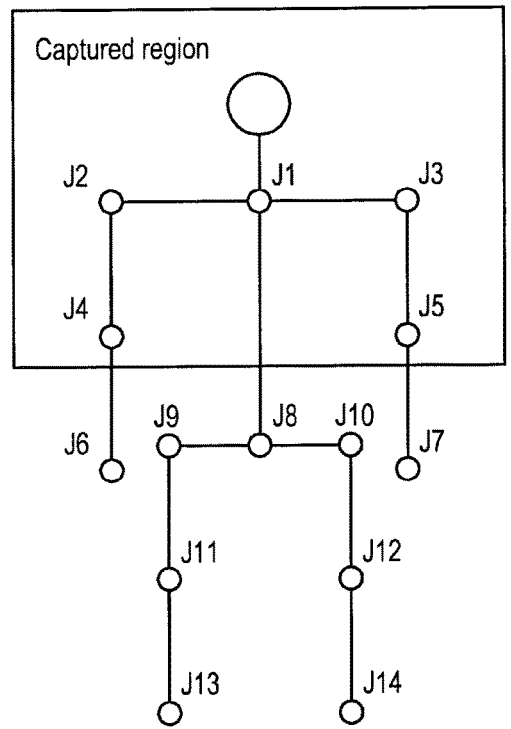
FIG.6A                FIG.6B
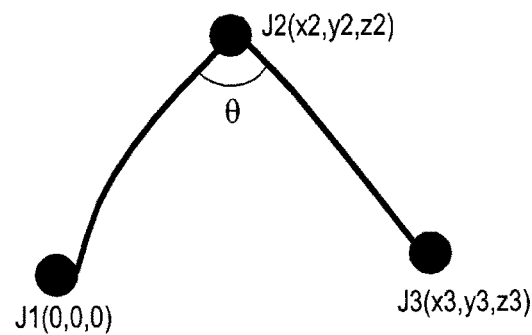
FIG.7

ELECTRONIC DEVICE AND METHOD FOR SHARING IMAGE

CLAIM OF PRIORITY

This application claims the priority under 35 U.S.C. § 119(a) to Korean Application Serial No. 10-2015-0105721, which was filed in the Korean Intellectual Property Office on Jul. 27, 2015, the entire content of which is hereby incorporated by reference.

TECHNICAL FIELD

The present disclosure relates to electronic devices, in general, and more particularly to electronic device and method for sharing image.

BACKGROUND

As electronic devices, such as a smart phone, a tablet Personal Computer (PC), a digital camera, a PC, and the like, have spread, and communication networks have developed, users have become able to share, with many people, images obtained by utilizing their electronic devices.

A conventional image sharing service for sharing images includes, for example, a personal broadcasting service. The personal broadcasting service may enable an individual to consume a shot image or multimedia contents (e.g., video content, audio content, and the like) with other people. Also, the personal broadcasting service may provide an optional service, such as a chat function, or the like, which enables people who consume the shot images or multimedia contents together to communicate with one another.

However, a recent image sharing service has developed beyond the conventional personal broadcasting service, and has been extended and utilized in education and various fields. For example, an image sharing service has been developed, which enables a user to participate in a lesson opened by a predetermined person so that the user may be helped by watching lessons, or which enables a user to open a lesson so as to give lessons to other people. Also, an image sharing service has been developed, which enables ordinary persons to be helped from experts in the predetermined field through live video. Also, an image sharing service for a video conference has been developed and has been utilized for the purpose of education, intra-communication, sharing media, or the like.

A personal broadcasting system for the conventional personal broadcasting service, which is an embodiment of an image sharing service, may include the configuration of FIG. 15. Referring to FIG. 15, an electronic device of a broadcaster 151 shoots the image of the broadcaster 151 using a video recorder 153, and transmits the shot image to an electronic device of at least one viewer (viewer 1 155, . . . , and viewer n 156) through a wired/wireless communication network 154. The image of the broadcaster 151 may be displayed on a screen 152 of the electronic device of the broadcaster 151, and the images of the viewers 155 and 156, which are received from the electronic devices of the viewers 155 and 156, or interaction (e.g., chat or the like) with the viewers 155 and 156 may be displayed together. Also, the electronic device of the viewer 155 may include a video recorder 157 and a screen 158, and may receive the image of the electronic device of the broadcaster 151 in association with a broadcast selected by the viewer so that the viewer 155 may view the corresponding image through the screen 158. Also, the electronic device of the viewer 155 may display the image obtained by shooting the viewer 155 on the screen 158 so that the viewer 155 may view the image shoot by the viewer 155 together with the received image of the electronic device of the broadcaster 151.

The operations of the conventional personal broadcasting system may be performed as described in FIG. 16. Referring to FIG. 16, when an electronic device 1601 of a broadcaster starts a video broadcast in operation 1610, and a viewer executes an image data reception function in operation 1620, the electronic device 16001 of the viewer may receive a video stream from the electronic device 1601 of the broadcaster in operation 1630. Depending on a personal broadcasting system, the electronic device 16001 of the viewer may display, on a screen, a broadcasting image associated with the received video stream, together with the video of the viewer, which is obtained by shooting the viewer, so that the viewer can view them.

SUMMARY

Although a conventional image sharing service is capable of displaying a sender side image and a receiver side image together, it does not have a function of automatically synchronizing the receiver side image based on the sender side image, and thus, it is difficult to evaluate the action or the environment of the receiver side. For example, in the case of a fitness coach who helps a viewer to perform exercise through a fitness broadcast using the conventional image sharing service, the fitness coach may shoot his/her fitness posture using an electronic device (e.g., a smart phone, a tablet PC, a kinect, or x-box, or the like), and may broadcast the same to viewers through a communication network in real time. A viewer may be capable of repeating after the fitness posture of the fitness coach by viewing the fitness broadcast, which is useful. However, the viewer may not be capable of receiving, from the fitness coach, the detailed comments associated with whether the viewer's posture is proper, which is a drawback.

Also, the image sharing service has limitations in performing various interactions between an image that a receiver side receives from a sender side (e.g., a broadcaster side image, a partner's image in a video call, or a partner's image in a video conference) and an image that the receiver side shoots (e.g., a viewer side image, an image of a viewer itself who is currently in a video call, or an image of a viewer itself who is currently in a video conference), for various purposes.

According to aspects of the disclosure, an electronic device is provided, comprising: a memory; at least one processor operatively coupled to the memory, configured to: receive a first image or metadata corresponding to the first image from an external electronic device; capture a second image by using a camera; detect a change of a first region of interest of the first image; change a second region of interest of the second image based on the change of the first region of interest; and display the second region of interest on a display, wherein displaying the second region of interest includes a displaying at least a portion of the second image that corresponds to the second region of interest.

According to aspects of the disclosure, a method is provided for use in an electronic device, comprising: receiving a first image or metadata corresponding to the first image from an external electronic device; capturing a second image by using a camera; detecting a change of a first region of interest of the first image; changing a second region of interest of the second image based on the change of the first region of interest; and displaying the second region of interest on a display, wherein displaying the second region of interest includes a displaying at least a portion of the second image that corresponds to the second region of interest.

According to aspects of the disclosure, a non-transitory computer-readable medium is provided that stores one or more processor-executable instructions which when executed by at least one processor cause the at least one processor to perform a method comprising the steps of: receiving a first image or metadata corresponding to the first image from an external device; capturing a second image by using a camera; detecting a change of a first region of interest of the first image; changing a second region of interest of the second image based on the change of the first region of interest; and displaying the second region of interest on a display, wherein displaying the second region of interest includes a displaying at least a portion of the second image that corresponds to the second region of interest.

According to aspects of the disclosure, an electronic device is provided, comprising: a communication module; a memory; at least one processor operatively coupled to the communication module and the memory, configured to: capture a first image by using a camera; transmit, via the communication module, the first image or metadata corresponding to the first image to an external electronic device; and receive second image information corresponding to the first image from the external electronic device via the communication module.

According to aspects of the disclosure, a method for use in an electronic device is provided, comprising: obtaining a first image through a camera; transmitting the first image or metadata corresponding to the first image to an external electronic device; and receiving, from the external electronic device, second image information corresponding to the first image.

According to aspects of the disclosure, a non-transitory computer-readable medium is provided that stores one or more processor-executable instructions which when executed by at least one processor cause the at least one processor to perform a method comprising the steps of: obtaining a first image through a camera; transmitting the first image or metadata corresponding to the first image to an external electronic device; and receiving, from the external electronic device, second image information corresponding to the first image.

BRIEF DESCRIPTION OF THE DRAWINGS

The above and other aspects, features, and advantages of the present disclosure will be more apparent from the following detailed description taken in conjunction with the accompanying drawings, in which:

FIG. 6A is a diagram illustrating the skeletal structure of a body, according to various embodiments of the present disclosure;

FIG. 6B is a diagram illustrating the skeletal structure of a body, according to various embodiments of the present disclosure;

FIG. 7 is a diagram illustrating an example of metadata, according to various embodiments of the present disclosure;

DETAILED DESCRIPTION

Figure 1:
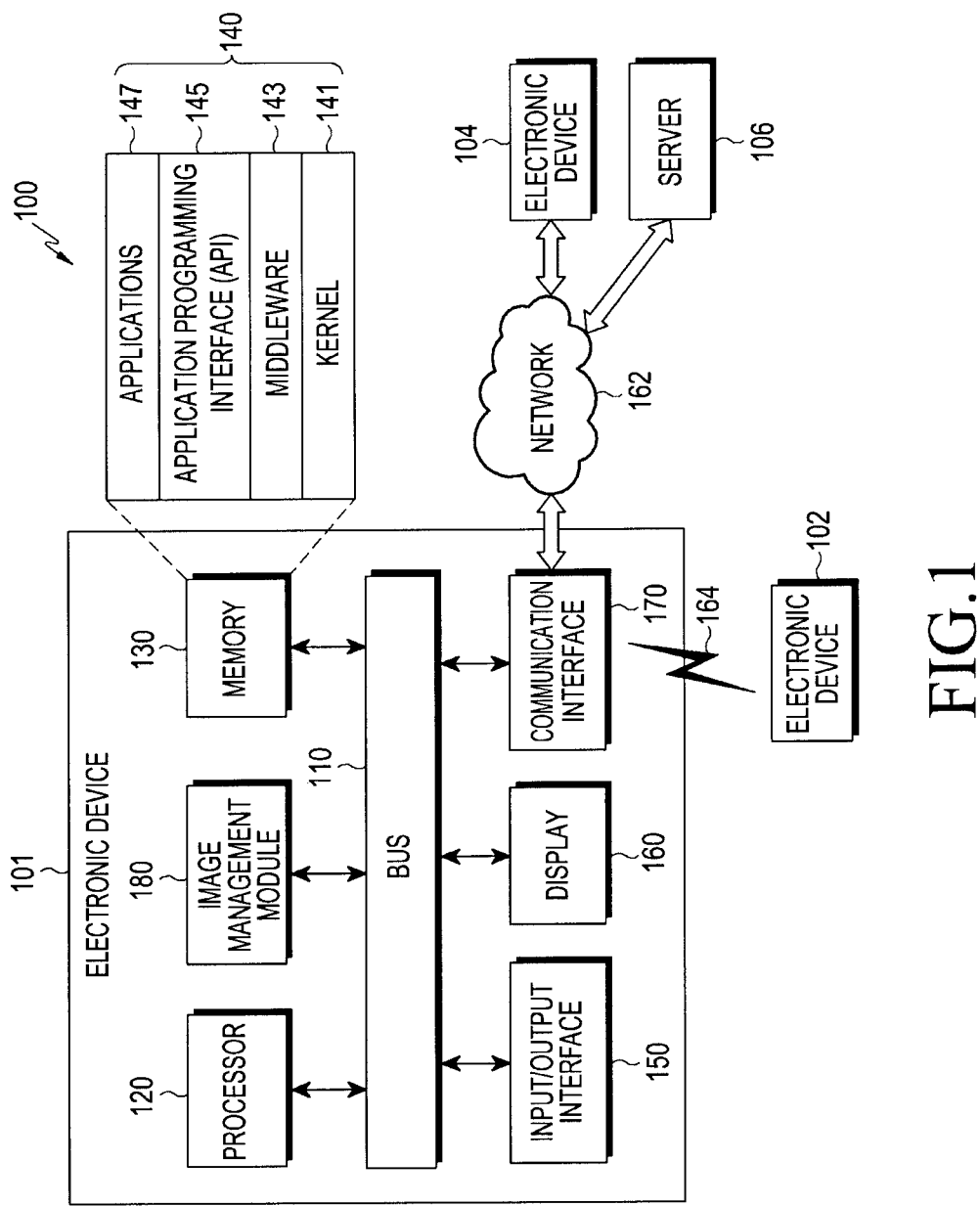
FIG. 1 is a diagram of an example of a network environment, according to various embodiments of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Additionally or alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The smart home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

An electronic device 101 in a network environment 100, according to various embodiments, is described with reference to FIG. 1. The electronic device 101 may include a bus 110, a processor 120, a memory 130, an input/output interface 150, a display 160, a communication interface 170, and an image management module 180. In some embodiments of the present disclosure, the electronic device 101 may omit at least one of the components, or may further include other components.

The bus 110 may include, for example, a circuit which interconnects the components 110 to 180 and delivers communication (e.g., a control message and/or data) among the components 110 to 180.

The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. For example, the processor 120 may include one or more of a Central Processing Unit (CPU), an Application Processor (AP), and a Communication Processor (CP). The processor 120, for example, may carry out operations or data processing related to the control and/or communication of at least one other component of the electronic device 101.

The memory 130 may include any suitable type of volatile or non-volatile memory, such as Random-access Memory (RAM), Read-Only Memory (ROM), Network Accessible Storage (NAS), cloud storage, a Solid State Drive (SSD), etc. The memory 130 may store, for example, instructions or data relevant to at least one other component of the electronic device 101. According to an embodiment of the present disclosure, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130) used for performing an operation or function implemented by the other programs (e.g., the middleware 143, the API 145, or the application programs 147). Also, the kernel 141 may provide an interface through which the middleware 143, the API 145, or the application programs 147 may access the individual components of the electronic device 101 to control or manage the system resources.

The middleware 143, for example, may function as an intermediary for allowing the API 145 or the application programs 147 to communicate with the kernel 141 to exchange data.

In addition, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or load balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, or text control.

The input/output interface 150 may function as, for example, an interface that may transfer commands or data input from a user or another external device to the other component(s) of the electronic device 101. Also, the input/output interface 150 may output the commands or data received from the other component(s) of the electronic device 101 to the user or another external device. A command input from the user may include, for example, a command for executing an image sharing service (e.g., a broadcasting service) provided in the electronic device 101, a command for executing a camera (not illustrated) that is functionally connected with the electronic device 101, a command for obtaining an image through the camera, a command for transmitting the obtained image to an external device (e.g., the electronic device 104), and/or a command for broadcasting the obtained image, based on a user's operation.

The display 160 may include, for example, a Liquid Crystal Display (LCD), a Light-Emitting Diode (LED) display, an Organic Light-Emitting Diode (OLED) display, a MicroElectroMechanical Systems (MEMS) display, and an electronic paper display. The display 160, for example, may display various types of contents (e.g., text, images, videos, icons, or symbols) to a user. The display 160 may include a touch screen, and may receive, for example, a touch, gesture, proximity, or hovering input using an electronic pen or the user's body part. The display 160 may display, for example, the execution screen of an application corresponding to an image sharing service. The execution screen may include a screen that displays an image that is obtained through a camera that is functionally connected with the electronic device 101. Also, the execution screen may include a screen that displays an image corresponding to information that is received from an external electronic device. Also, the execution screen may include a chat screen that enables a user of the electronic device 101 and at least one participant who participates in an image sharing service that is opened by the electronic device 101, to chat with one another.

The communication interface 170, for example, may set communication between the electronic device 101 and an external device (e.g., a first external electronic device 102, the second external electronic device 104, or a server 106). For example, the communication interface 170 may be connected to a network 162 through wireless or wired communication to communicate with an external device (e.g., the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. In addition, the wireless communication may include, for example, short-range communication 164. The short-range communication 164 may be performed by using at least one of, for example, Wi-Fi, Bluetooth, Near Field Communication (NFC), Global Navigation Satellite System (GNSS), and the like. The GNSS may include at least one of, for example, a Global Positioning System (GPS), a Global Navigation Satellite System (Glonass), a Beidou Navigation Satellite System (hereinafter referred to as "Beidou"), and a European Global Satellite-based Navigation System (Galileo), according to a use area, a bandwidth, or the like. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), a Plain Old Telephone Service (POTS), and the like. The network 162 may include at least one of a communication network such as a computer network (e.g., a LAN or a WAN), the Internet, and a telephone network.

Each of the first and second external electronic devices 102 and 104 may be of a type that is identical to, or different from, that of the electronic device 101. According to an embodiment of the present disclosure, the first external electronic device 102 may be a TV, and may be functionally connected with the electronic device 101 so that the first external electronic device 102 may transmit or receive data through the communication interface 170 and may share an image. Also, the first external electronic device 102 may be a camera, and may be functionally connected with the electronic device 101 so that the first external electronic device 102 may share, with the electronic device 101, an image obtained through the camera. According to an embodiment of the present disclosure, the server 106 may include a group of one or more servers. According to various embodiments of the present disclosure, all or some of the operations performed in the electronic device 101 may be performed in another electronic device or a plurality of electronic devices (e.g., the electronic devices 102 and 104 or the server 106). According to an embodiment of the present disclosure, when the electronic device 101 has to perform some functions or services automatically or in response to a request, the electronic device 101 may make a request for performing at least some functions relating thereto to another device (e.g., the electronic device 102 or 104 or the server 106) instead of, or in addition to, performing the functions or services by itself. Another electronic device (e.g., the electronic device 102 or 104 or the server 106) may execute the requested functions or the additional functions, and may deliver the result of the execution to the electronic device 101. The electronic device 101 may provide the received result as it is, or may additionally process the received result, and may provide the requested functions or services. To this end, for example, cloud computing, distributed computing, or client-server computing technology may be used.

The image management module 180 may be embodied as, for example, a processor. Also, the image management module 180, for example, may display a second image that is obtained through a camera that is functionally connected with the electronic device 101 through a display that is functionally connected with the electronic device 101. Also, the image management module 180, for example, may determine the change of a first region of interest of a first image, and may change a second region of interest of the second image based on the change and may display the same through the display 160. The detailed descriptions of the image management module 180 will be provided in the descriptions associated with FIGS. 4 to 15.

Figure 2:
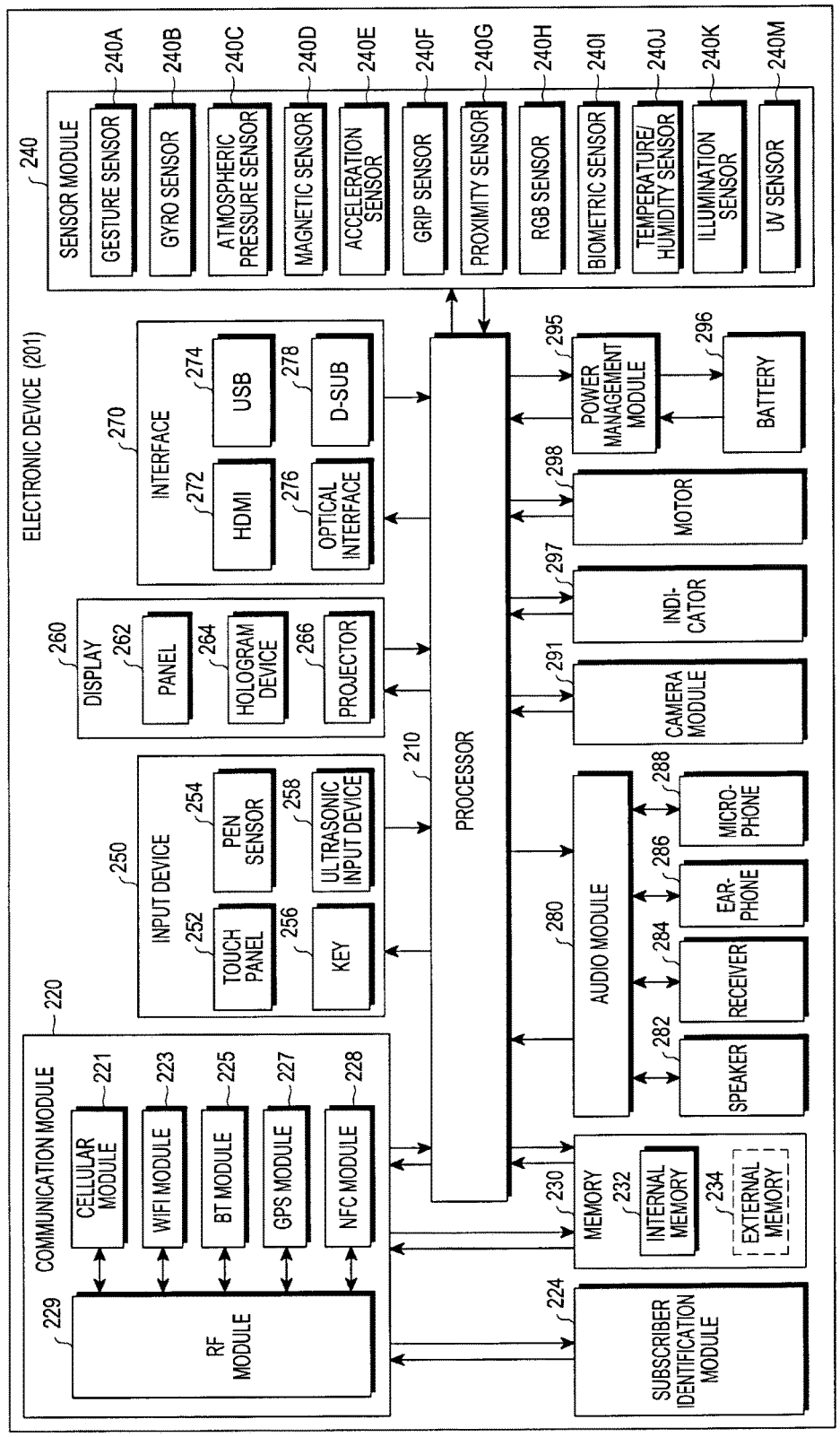
FIG. 2 is a diagram of an example of an electronic device, according to various embodiments of the present disclosure.

FIG. 2 is a diagram of an example of an electronic device, according to various embodiments of the present disclosure. The electronic device 201 may include, for example, the whole or a part of the electronic device 101 illustrated in FIG. 1. The electronic device 201 may include at least one processor 210 (e.g., an Application Processor (AP)), a communication module 220, a subscriber identification module 224, a memory 230, a sensor module 240, an input device 250, a display 260, an interface 270, an audio module 280, a camera module 291, a power management module 295, a battery 296, an indicator 297, and a motor 298.

The processor 210 may drive, for example, an operating system or application programs to control a plurality of hardware or software elements connected thereto and to perform various types of data processing and operations. The processor 210 may be embodied as, for example, a System on Chip (SoC). According to an embodiment of the present disclosure, the processor 210 may further include a Graphic Processing Unit (GPU) and/or an image signal processor. The processor 210 may also include at least some (e.g., a cellular module 221) of the components illustrated in FIG. 2. The processor 210 may load, into a volatile memory, commands or data received from at least one (e.g., a non-volatile memory) of the other components and may process the loaded commands or data, and may store various data in a non-volatile memory.

The communication module 220 may have a configuration that is equal or similar to that of the communication interface 170 of FIG. 1. The communication module 220 may include, for example, a cellular module 221, a Wi-Fi module 223, a Bluetooth module 225, a GNSS module 227 (e.g., a GPS module, a Glonass module, a Beidou module, or a Galileo module), an NFC module 228, and a Radio Frequency (RF) module 229.

The cellular module 221 may provide a voice call, an image call, a text message service, an Internet service, or the like through, for example, a communication network. According to an embodiment of the present disclosure, the cellular module 221 may identify and authenticate the electronic device 201 within a communication network using a subscriber identification module (e.g., the SIM card 224). According to an embodiment of the present disclosure, the cellular module 221 may perform at least some of the functions that the processor 210 may provide. According to an embodiment of the present disclosure, the cellular module 221 may include a Communication Processor (CP).

For example, each of the Wi-Fi module 223, the BT module 225, the GPS module 227, and the NFC module 228 may include a processor for processing data transmitted/received through a corresponding module. According to some embodiments of the present disclosure, at least some (e.g., two or more) out of the cellular module 221, the Wi-Fi module 223, the BT module 225, the GNSS module 227, and the NFC module 228 may be included in one Integrated Chip (IC) or IC package.

The RF module 229 may transmit/receive, for example, a communication signal (e.g., an RF signal). The RF module 229 may include, for example, a transceiver, a Power Amp Module (PAM), a frequency filter, a Low Noise Amplifier (LNA), an antenna, or the like. According to another embodiment of the present disclosure, at least one out of the cellular module 221, the Wi-Fi module 223, the BT module 225, the GNSS module 227, and the NFC module 228 may transmit/receive an RF signal through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 or an external memory 234. The embedded memory 232 may include at least one of, for example, a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard driver, or a Solid State Drive (SSD).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a multi-media card (MMC), a memory stick, or the like. The external memory 234 may be functionally and/or physically connected to the electronic device 201 through various interfaces.

The sensor module 240 may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, a light sensor 240K, and a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments of the present disclosure, the electronic device 201 may further include a processor that is configured to control the sensor module 240 as a part of or separately from the processor 210, and may control the sensor module 240 while the processor 210 is in a sleep state.

The input device 250 may include, for example, a touch panel 252, a (digital) pen sensor 254, a key 256, and an ultrasonic input unit 258. The touch panel 252 may use at least one of, for example, a capacitive scheme, a resistive scheme, an infrared scheme, and an ultrasonic scheme. Also, the touch panel 252 may further include a control circuit. The touch panel 252 may further include a tactile layer, and may provide a tactile reaction to a user.

The (digital) pen sensor 254 may include, for example, a recognition sheet which is a part of the touch panel or is separated from the touch panel. The key 256 may include, for example, a physical button, an optical key, or a keypad. The ultrasonic input device 258 may detect ultrasonic waves generated by an input tool through a microphone (e.g., the microphone 288), and may determine data corresponding to the detected ultrasonic waves.

The display 260 (e.g., the display 160) may include a panel 262, a hologram device 264, or a projector 266. The panel 262 may include a configuration that is identical or similar to that of the display 160 illustrated in FIG. 1. The panel 262 may be embodied to be, for example, flexible, transparent, or wearable. The panel 262 and the touch panel 252 may be embodied as one module. The hologram device 264 may show a three dimensional (3D) image in the air by using the interference of light. The projector 266 may display an image by projecting light onto a screen. The screen may be located, for example, inside or outside the electronic device 201. According to an embodiment of the present disclosure, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-sub-miniature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may bilaterally convert, for example, a sound and an electrical signal. At least some components of the audio module 280 may be included in, for example, the input/output interface 150 illustrated in FIG. 1. The audio module 280 may process sound information which is input or output through, for example, a speaker 282, a receiver 284, earphones 286, the microphone 288, or the like.

The camera module 291 is a device which may shoot a still image and a dynamic image. According to an embodiment of the present disclosure, the camera module 291 may include one or more image sensors (e.g., a front sensor or a back sensor), a lens, an Image Signal Processor (ISP) or a flash (e.g., LED or xenon lamp).

The power management module 295 may manage, for example, power of the electronic device 201. According to an embodiment of the present disclosure, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, the residual quantity of the battery 296, and a voltage, a current, or a temperature during charging. The battery 296 may include, for example, a rechargeable battery and/or a solar battery.

The indicator 297 may display a particular state (for example, a booting state, a message state, a charging state, or the like) of the electronic device 201 or a part (e.g., the processor 210) of the electronic device 201. The motor 298 may convert an electrical signal into mechanical vibration, and may generate vibration, a haptic effect, or the like. Although not illustrated, the electronic device 201 may include a processing device (e.g., a GPU) for supporting a mobile television (TV). The processing device for supporting the mobile TV may, for example, process media data according to a certain standard, such as Digital Multimedia Broadcasting (DMB), Digital Video Broadcasting (DVB), MediaFlo™, or the like.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
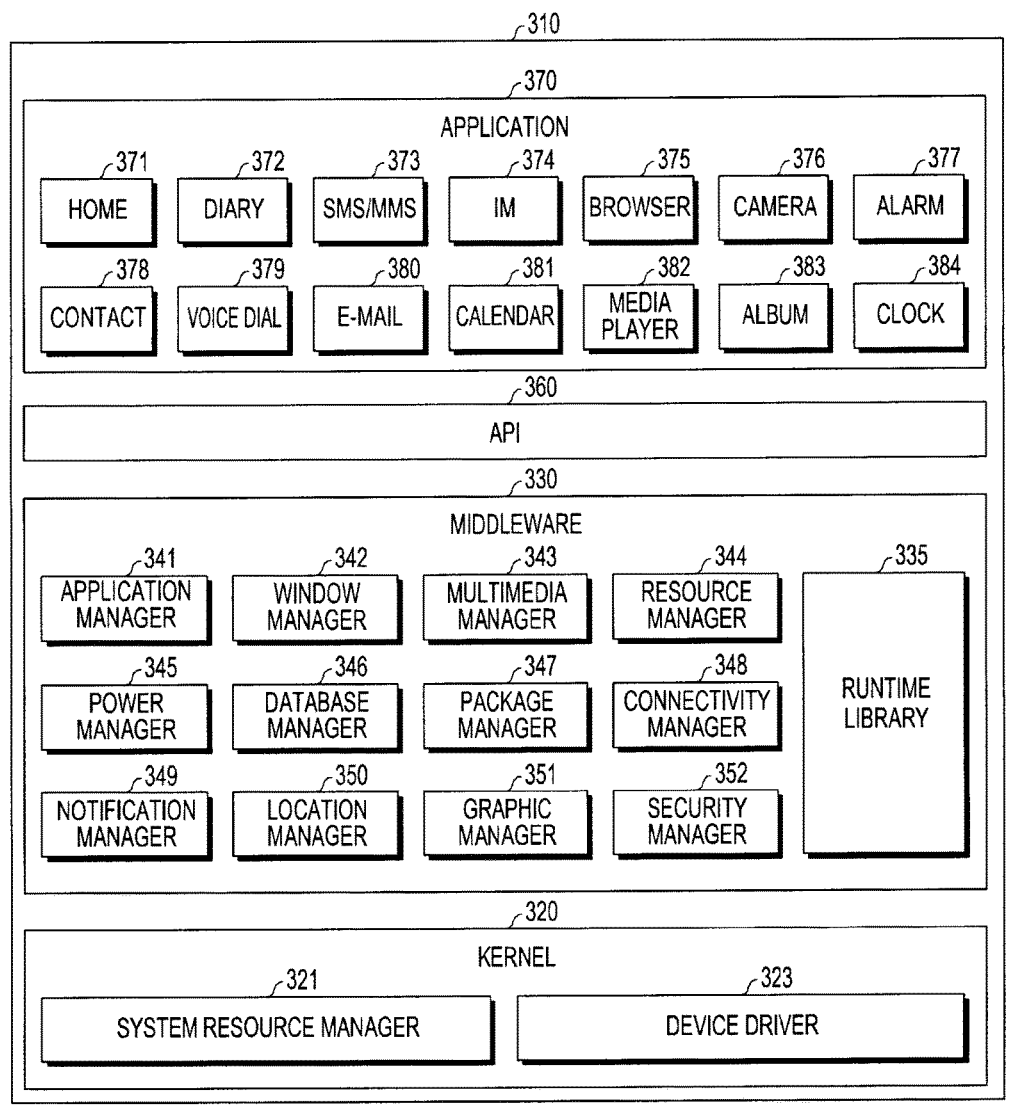
FIG. 3 is a block diagram of an example of a programming module, according to various embodiments of the present disclosure.

FIG. 3 is a block diagram of an example of a programming module, according to various embodiments of the present disclosure. According to an embodiment of the present disclosure, the program module 310 (e.g., the program 140) may include an Operating System (OS) for controlling resources related to an electronic device (e.g., the electronic device 101) and/or various applications (e.g., the application programs 147) executed in the operating system. The operating system may be, for example, Android, iOS, Windows, Symbian, Tizen, Bada, or the like.

The program module 310 may include a kernel 320, middleware 330, an Application Programming Interface (API) 360, and/or applications 370. At least a part of the program module 310 may be preloaded on the electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may control, assign, or collect system resources. According to an embodiment of the present disclosure, the system resource manager 321 may include a process manager, a memory manager, a file system manager, or the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330, for example, may provide a function required by the applications 370 in common or may provide various functions to the applications 370 through the API 360 so that the applications 370 may efficiently use limited system resources in the electronic device. According to an embodiment of the present disclosure, the middleware 330 (e.g., the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335, for example, may include a library module that a compiler uses in order to add a new function through a programming language while the applications 370 are being executed. The runtime library 335 may perform input/output management, memory management, or a function associated with an arithmetic function.

The application manager 341 may, for example, manage the life cycle of at least one of the applications 370. The window manager 342 may manage Graphical User Interface (GUI) resources used on a screen. The multimedia manager 343 may determine a format required to reproduce various media files, and may encode or decode a media file by using a coder/decoder (codec) appropriate for the corresponding format. The resource manager 344 may manage resources of at least one of the applications 370, such as a source code, a memory, a storage space, or the like.

The power manager 345 may operate together with, for example, a Basic Input/Output System (BIOS) to manage a battery or power, and may provide power information required for the operations of the electronic device. The database manager 346 may generate, search for, and/or change a database to be used by at least one of the applications 370. The package manager 347 may manage the installation or updating of an application distributed in the form of a package file.

The connectivity manager 348 may manage a wireless connection, for example, Wi-Fi, Bluetooth, or the like. The notification manager 349 may display or report an event, such as an arrival message, an appointment, a proximity notification, and the like, in such a manner not to disturb a user. The location manager 350 may manage the location information of the electronic device. The graphic manager 351 may manage a graphic effect to be provided to a user, and a user interface relating to the graphic effect. The security manager 352 may provide all security functions required for system security, user authentication, or the like. According to an embodiment of the present disclosure, when the electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of operating system in order to provide a differentiated function. Furthermore, the middleware 330 may dynamically remove some of the existing components, or may add new components.

The API 360 (e.g., the API 145) is, for example, a set of API programming functions, and may be provided with a different configuration according to an OS. For example, in the case of Android or iOS, one API set may be provided for each platform, and in the case of Tizen, two or more API sets may be provided for each platform.

The applications 370 (e.g., the application programs 147) may include, for example, one or more applications that is capable of performing functions, such as home 371, dialer 372, SMS/MMS 373, Instant Message (IM) 374, browser 375, camera 376, alarm 377, contacts 378, voice dial 379, e-mail 380, calendar 381, media player 382, album 383, clock 384, health care (e.g., measuring exercise quantity or blood sugar), or providing environment information (e.g., providing atmospheric pressure, humidity, temperature information or the like).

According to an embodiment of the present disclosure, the applications 370 may include an application (hereinafter, referred to as an "information exchange application" for convenience of description) that supports exchanging information between the electronic device (e.g., the electronic device 101) and an external electronic device (e.g., the electronic device 102 or 104). The information exchange application may include, for example, a notification relay application for transferring predetermined information to an external electronic device, or may include a device management application for managing an external electronic device.

For example, the notification relay application may include a function of transferring, to an external electronic device (e.g., the electronic device 102 or 104), notification information generated from other applications of the electronic device (e.g., an SMS/MMS application, an e-mail application, a health care application, an environmental information application, or the like). Further, the notification relay application may receive notification information from, for example, an external electronic device, and may provide the received notification information to a user.

The device management application may manage (e.g., install, delete, or update), for example, at least one function of an external electronic device (e.g., the electronic device 102 or 104) communicating with the electronic device (e.g., a function of turning on/off the external electronic device itself (or some components) or a function of adjusting luminance (or a resolution) of the display), applications operating in the external electronic device, or services provided by the external electronic device (e.g., a call service, a message service, or the like).

According to an embodiment of the present disclosure, the applications 370 may include an application (e.g., a health care application of a mobile medical appliance or the like) designated according to attributes of the external electronic device (e.g., the electronic device 102 or 104). According to an embodiment of the present disclosure, the applications 370 may include an application received from an external electronic device (e.g., the server 106, or the electronic device 102 or 104). According to an embodiment of the present disclosure, the applications 370 may include a preloaded application or a third party application which can be downloaded from the server. The names of the components of the program module 310, according to the above-described embodiments of the present disclosure, may change depending on a type of OS.

According to various exemplary embodiments of the present disclosure, at least some of the program module 310 may be embodied as software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, or a process for performing one or more functions.

Figure 4:
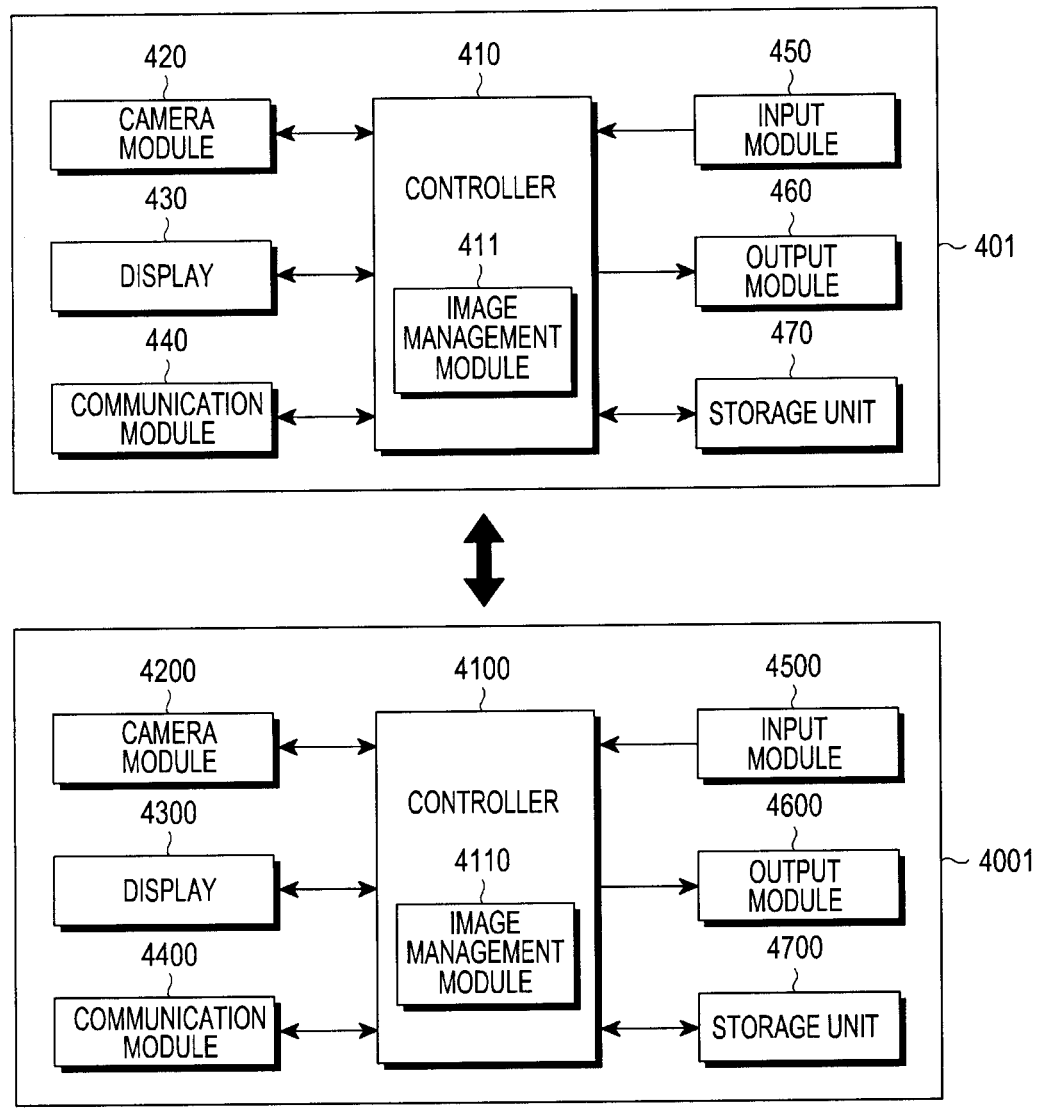
FIG. 4 is a block diagram of an example of a system for image sharing, according to various embodiments of the present disclosure.

FIG. 4 is a block diagram of an example of a system for image sharing, according to various embodiments of the present disclosure. As illustrated, the system may include a first electronic device 401 and a second electronic device 4001.

The first electronic device 401 may be, for example, the electronic device 101 illustrated in FIG. 1. Referring to FIG. 4, the first electronic device 401 may include a controller 410, a camera module 420, a display 430, a communication module 440, an input module 450, an output module 460, and a storage unit 470.

According to various embodiments of the present disclosure, the camera module 420 may be the camera module 291 of FIG. 2. For example, the camera module 420 may generate a video image by shooting a predetermined person (e.g., a broadcaster or a viewer). Also, the camera module 420 may include a depth camera.

According to various embodiments of the present disclosure, the display 430 may be the display 160 illustrated in FIG. 1. For example, the display 430 may display an image that is generated by being shot through the camera module 420, or may display an image received from an external electronic device (e.g., the second electronic device 4001) through the communication module 440. Also, for example, the display 430 may display the execution screen of an application corresponding to an image sharing service when an image sharing service-dedicated application is executed based on a user's operation through the input module 450. The execution screen of the application corresponding to the image sharing service may include at least one out of: a broadcaster side screen that displays an image broadcasted by the broadcaster, at least one viewer side screen that displays an image received from a viewer's electronic device, and a message screen that displays message conversations between the broadcaster and a viewer. The viewer side screen may be displayed in a pop-up form when an image is received from a viewer's electronic device. Also, the broadcaster side screen, the viewer side screen, and/or the message screen may reduce the size of a screen, enlarge the size of a screen, move a screen, hide a screen, terminate displaying a screen, display a screen by terminating a hide function of a hidden screen, and/or display a screen by terminating a display termination function of a screen of which displaying is terminated.

According to various embodiments of the present disclosure, the communication module 440 may be the communication interface 170 of FIG. 1. For example, the communication module 440 may transmit and/or receive an image, metadata, feedback information, and/or indication information through a network. Also, for example, the communication module 440 may establish a one-to-many broadcast session and a one-to-one broadcast session.

According to various embodiments of the present disclosure, the controller 410 may be the processor 120 illustrated in FIG. 1. Also, the controller 410 may control the camera module 420, the display 430, the communication module 440, the input module 450, the output module 460, and the storage unit 470 (e.g., the memory 130).

According to various embodiments of the present disclosure, the controller 410 may include an image management module 411.

According to various embodiments of the present disclosure, the image management module 411 may obtain a first image through a camera that is functionally connected with the electronic device 401. The functionally connected camera may be, for example, a camera module 4200 or an external electronic device. Hereinafter, descriptions will be provided based on the case in which the functionally connected camera is the camera module 4200.

According to various embodiment of the present disclosure, the image management module 411 may receive second image information from the external electronic device through a communication module 4400.

The first image and/or the second image may be, for example, a broadcasting image.

For example, the broadcasting image may be an image that is shot through the camera module 420 in real time. Also, the broadcasting image may be provided in the form of a video stream that is generated by shooting a predetermined person.

According to various embodiments of the present disclosure, the image management module 411 may display the first image through a display that is functionally connected with an electronic device. The functionally connected display may be, for example, a display 4300 or an external electronic device (e.g., a TV, a computer, or the like). Hereinafter, descriptions will be provided based on the case in which the functionally connected display is the display 4300.

According to various embodiments of the present disclosure, the image management module 411 may analyze the first image and/or the second image, and may generate metadata by determining or generating the feature points of the first image and/or the second image. For example, the image management module 411 may determine a plurality of feature points from the first image, and may include at least some feature points of the plurality of feature points as at least some of the metadata. Also, under the control of the image management module 411, the first image may be overlaid with the feature points and may be displayed through the display 4300.

Figure 5:
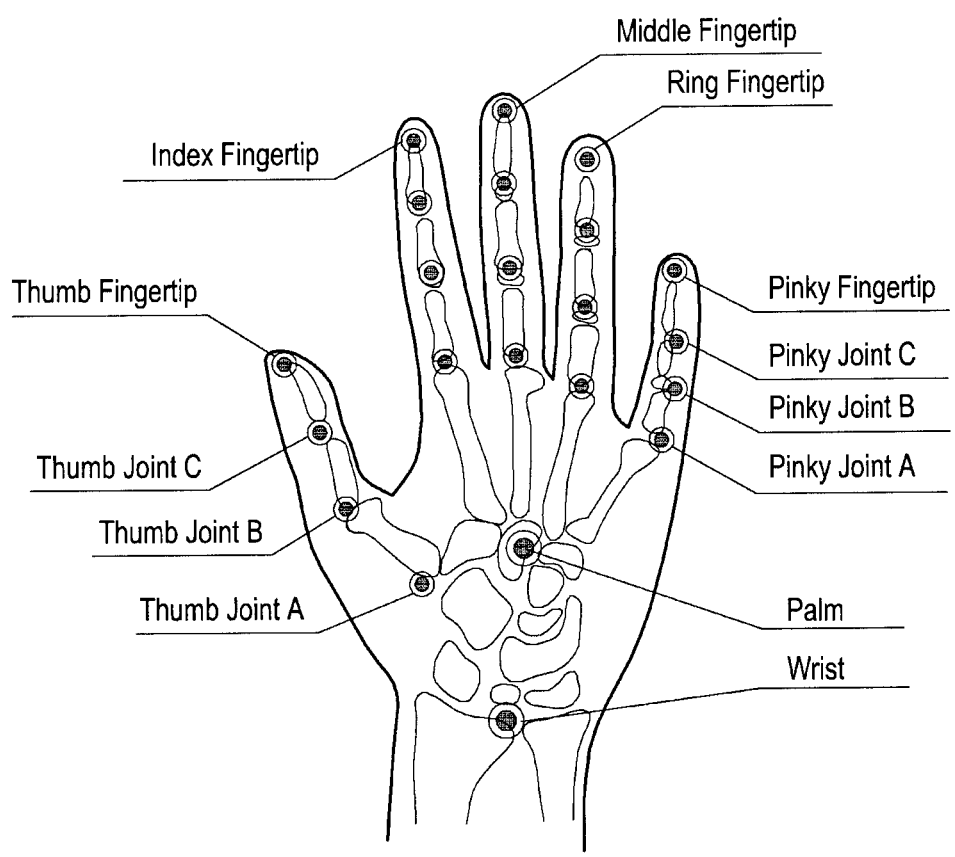
FIG. 5 is a diagram illustrating the skeletal structure of a hand, according to various embodiments of the present disclosure.

For example, the image management module 411 may extract feature points, such as the joints of a human body and/or the end part of the human body (e.g., the end part of a skeletal structure) included in the first image and/or the second image. For example, as illustrated in FIG. 5, the image management module 411 may extract the feature points of the entire hand, and may identify various operations. Feature points may be extracted from a face. Also, an identification (ID) may be assigned with each feature.

For example, the image management module 411 may analyze an image using a conventional image analysis technology without using a separate device, and may extract feature points included in the first image and/or the second image. Also, for example, feature points included in the frame of an image that is currently shot or reproduced may be extracted through the image analysis, and the ID of each extracted feature may be generated. Also, for example, the entire skeletal structure of the human body may be simplified through the image analysis as illustrated in FIGS. 6A and 6B, and each joint may be regarded as a feature and an ID may be assigned to each feature. Also, when a part that the camera module 420 currently shoots is the upper half of the human body, information associated with feature points named J1, J2, J3, J4, and J5 may be generated as metadata associated with a frame that is currently displayed on a screen, as illustrated in FIG. 6B. Also, the metadata associated with the frame that is currently displayed on the screen may be extracted even when a received image is reproduced. Also, feature points included in an area of a shot area or a frame that is currently displayed on the screen may be extracted, and the correlation between the feature points may be additionally generated as the metadata. Referring to FIG. 7, the IDs and the locations (absolute locations or relative locations), angles, and the like of feature points may be generated as the metadata.

According to various embodiments of the present disclosure, the image management module 411 may transmit, through the communication module 440, the first image or metadata corresponding to the first image to an external electronic device (e.g., the electronic device 4001) of the electronic device 401. Additionally or alternatively, the image management module 411 may transmit image data corresponding to the first image to the external electronic device through the communication module 440, and the image data may include, for example, the metadata and/or the first image.

According to various embodiments of the present disclosure, the image management module 411 may determine a region of interest of the first image based on at least some feature points out of a plurality of feature points corresponding to the first image. Also, the image management module 411 may display, in the first image, the region of interest of the first image, or may include the region of interest of the first image in metadata corresponding to the first image so that the region of interest of the first image may be reproduced in the external electronic device.

According to various embodiments of the present disclosure, the image management module 411 may determine a region of interest of the second image based on at least some feature points out of a plurality of feature points corresponding to the second image. Also, the image management module 411 may display, in the second image, the region of interest of the second image, or may include the region of interest of the second image in metadata corresponding to the second image so that the region of interest of the second image may be reproduced in the external electronic device.

According to various embodiments of the present disclosure, the image management module 411 may determine a region of interest of the first image based on at least some feature points out of a plurality of feature points corresponding to the first image. Also, the image management module 411 may display the region of interest in the first image, or may include the region of interest in metadata corresponding to the first image so that the region of interest may be reproduced in the external electronic device.

According to various embodiments of the present disclosure, the image management module 411 may determine a region of interest of the second image based on at least some feature points out of a plurality of feature points corresponding to the second image. Also, the image management module 411 may display the region of interest in the second image, or may include the region of interest in metadata corresponding to the second image so that the region of interest may be reproduced in the external electronic device.

According to various embodiments of the present disclosure, the image management module 411 may obtain, from the second image information, information corresponding to the result of comparison between the first region of interest of the first image and the second region of interest of the second image, and may display the information in association with the first image through the display 430.

In association with the first region of interest, for example, when the first image is an image obtained by zooming in on a predetermined area while a broadcaster who uses the first electronic device 401 performs shooting, the electronic device 401 may determine that the predetermined area is a region of interest. Additionally or alternatively, in association with the first region of interest, based on an input (e.g., a gesture, a line of sight, operating a key, a voice, and the like) corresponding to a predetermined area in the first image, which is provided while the broadcaster performs shooting, the predetermined area may be determined as a region of interest. Additionally or alternatively, in association with the first region of interest, based on an input (e.g., a gesture, a line of sight, operating a key, a voice, and the like) corresponding to a predetermined area in the second area, which is provided from a viewer who uses an external electronic device, the predetermined area may be determined as a region of interest.

The information corresponding to the result of the comparison between the first region of interest of the first image and the second region of interest of the second image may be, for example, feedback information. For example, the feedback information may be information that is transmitted as a result obtained when an external electronic device compares whether an image that the first electronic device 401 broadcasts through the communication module 440 corresponds to a shot image of the external electronic device.

Also, the feedback information, for example, may be output as an image corresponding to the feedback information through the display 430, may be output as a sound corresponding to the feedback information through the speaker (not illustrated; for example, the speaker 282) of the output module 460, and/or may be output as a vibration corresponding to the feedback information through a motor (not illustrated; for example, the motor 298) of the output module 460 under the control of the image management module 411.

For example, when the broadcast of the first electronic device 401 is a predetermined lesson broadcast, viewers who do well at repeating after the broadcast and viewers who have difficulty in repeating after the broadcast may be distinguished based on feedback information received from a reception side electronic device; that is, information that is transmitted as the result of a comparison of whether a broadcasting image and a shot image of the reception side electronic device correspond to each other. For example, viewer information and/or a viewer image may be displayed in the display 430 in the broadcaster side screen by distinguishing the viewers who do well at repeating after the broadcast and the viewers who have difficulty in repeating after the broadcast.

According to various embodiments of the present disclosure, the image management module 411 may transmit, to the external electronic device, indication information associated with the second image information that corresponds to the first image and is received from the external electronic device. For example, the image management module 411 may transmit the indication information to the external electronic device based on the feedback information. For example, the image management module 411 may display, in the display 430, the second image to correspond to the region of interest of the first image, and may transmit the indication information to the reception side electronic device corresponding to the feedback information through the communication module 440 based on a user's operation input through the input module 450.

For example, the indication information may be information that is input by a user's operation through the input module 450. When the indication information is input according to a user's operation through the input module 450, the indication information may be transmitted through the communication module 440. Also, the indication information may be output as an image corresponding to the input information through the display 430, may be output as a sound corresponding to the input information through the speaker (e.g., the speaker 282) of the output module 460, and/or may be output as a vibration corresponding to the input information through a motor (e.g., the motor 298) of the output module 460 under the control of the image management module 411.

According to various embodiments of the present disclosure, the image management module 411 may change the region of interest of the first image from a first area to a second area based on the region of interest of the second image information that corresponds to the first image and is received from the external electronic device.

According to various embodiment of the present disclosure, the image management module 411 may broadcast the first image through the communication module 440.

The second electronic device 4001 may be, for example, the electronic device 101 illustrated in FIG. 1. Referring to FIG. 4, the second electronic device 4001 may include a controller 4100, a camera module 4200, a display 4300, a communication module 4400, an input module 4500, an output module 4600, and a storage unit 4700.

According to various embodiments of the present disclosure, the camera module 4200, the display 4300, the communication module 440, the input module 4500, the output module 4600, and the storage unit 4700 may perform operations respectively identical to those of the camera module 420, the display 430, the communication module 440, the input module 450, the output module 460, and the storage unit 470 of the first electronic device 401, and the detailed description thereof will be omitted.

According to various embodiments of the present disclosure, the controller 4100 may be the processor 120 illustrated in FIG. 1. Also, the controller 4100 may control the camera module 4200, the display 4300, the communication module 4400, the input module 4500, the output module 4600, and the storage unit 4700.

According to various embodiments of the present disclosure, the controller 4100 may include an image management module 4110.

The image management module 4110 may perform the operations identical to the image management module 411 of FIG. 4.

According to various embodiments of the present disclosure, the image management module 4110 may receive a first image or metadata corresponding to the first image, from an external electronic device (e.g., the electronic device 401) of the electronic device 4001, through the communication module 4400. The metadata may include a plurality of feature points corresponding to the first image.

According to various embodiments of the present disclosure, the image management module 4110 may generate a plurality of feature points from the first image.

According to various embodiments of the present disclosure, the image management module 4110 may display a second image obtained through a camera that is functionally connected with the electronic device, through a display that is functionally connected with the electronic device 4001. The functionally connected display may be, for example, the display 4300 or an external electronic device (e.g., a TV, a computer, or the like). Also, the functionally connected camera may be, for example, the camera module 4200 or an external electronic device. Hereinafter, descriptions will be provided based on the case in which the functionally connected display is the display 4300 and the functionally connected camera is the camera module 4200.

According to various embodiments of the present disclosure, the image management module 4110 may determine the change of a first region of interest of the first image, and may change a second region of interest of the second image based on the change and may display the same through the display 4300.

According to various embodiments of the present disclosure, the image management module 4110 may set a first area of the first image as the first region of interest when the metadata is first metadata, and may set a second area of the first image as the first region of interest when the metadata is second metadata.

According to various embodiments of the present disclosure, the image management module 4110 determines whether at least a portion of the first image is selected based on a user's action associated with the electronic device, sets the portion as the first region of interest when the selection exists, and sets the entire first image as the first region of interest when the selection does not exist. When the first image is, for example, the image of a predetermined area that is zoomed in while a broadcaster performs shooting, the image management module 4110 may determine the predetermined area as the region of interest. Also, the image management module 4110 may display the received image in the display 4300, and may receive a viewer's input (e.g., a gesture, a line of sight, and operating a key) that corresponds to a predetermined area of the received image. For example, the image management module 4110 may receive the entire area of the image from the first electronic device 401 which is the broadcaster side electronic device, and may enable a user of the second electronic device 4001, which is the receiver side electronic device, to determine a region of interest using a designated input, such as a gesture, a line of sight, operating a key, a voice, and the like.

According to various embodiments of the present disclosure, the image management module 4110 may determine a plurality of feature points from the second image, may select at least some feature points corresponding to the first region of interest from the plurality of feature points, and may determine the second region of interest based on the at least some feature points. As is discussed further below, each of the feature points may be associated with a particular object of interest that is depicted in the second image (e.g., a finger joint). According to various embodiments of the present disclosure, as the first region of interest is changed from a first area of the first image to a second area, the image management module 4110 may change the second region of interest from a third area of the second image to a fourth area. The third area corresponds to the first area, and the fourth area corresponds to the second area. In other words, in some implementations, the image management module 4110 may change at least one of the size and location of the second region of interest.

According to various embodiment of the present disclosure, the image management module 4110 may display the second image simultaneously with the first image.

According to various embodiments of the present disclosure, the image management module 4110 may display the second image of which the second region of interest is changed simultaneously with the first image of which the first region of interest is changed.

For example, the image management module 4110 may perform synchronization so that corresponding parts between the first image and the second image are displayed. For example, when the first image is a predetermined area that is zoomed in while a broadcaster performs shooting, the image management module 4110 may determine the predetermined area as a region of interest, and may zoom in an area that is associated with the region of interest in the second image (e.g., a part including corresponding feature IDs). The operation of zooming in the area associated with the region of interest in the second image may be performed by controlling the camera module 4200, under the control of the image management module 4110, or may be processed in a media player application (not illustrated) of the electronic device 4001. For example, in the case in which the first electronic device 401 zooms in on a predetermined area while capturing video, when the first electronic device 401 transmits image data corresponding thereto (e.g., the image of the predetermined area out of the entire image, or the entire image including the image of the predetermined area and information associated with the predetermined area), the controller 4100 of the second electronic device 4001 may enable the camera module 4200 to zoom in on a part having feature IDs corresponding to the predetermined area, or may enable a media player application to perform a zooming-in process by letting the camera module 4200 shoot the entire area when the camera module 4200 of the second electronic device 4001 shoots the entire area of a viewer, when the camera module 4200 of the second electronic device 4001 shoots the entire area of the viewer.

For example, the image management module 4110 may overlay an image included in image data received through the communication module 4400 or an image that a viewer side shoots through the camera module 4200, with information associated with metadata included in the received image data, and may display the same. For example, when the metadata includes the IDs of feature points displayed in the frame of an image and a correlation thereof, the image management module 4110 may overlay an image included in image data and/or an image that a viewer side shoots through the camera module 4200 with a visual effect obtained by connecting the feature points as a line, and may display the same in the display 4300. In this process, a scaling operation (enlarging or reducing) with respect to an image and/or visual effect may be performed as occasion demands. For example, when a difference exists in the builds between a person in an image included in image data and a person in an image shot by the camera module 4200, an overlay image may be appropriately fit through scaling.

According to various embodiments of the present disclosure, the image management module 4110 may compare the first image and the second image, and may output the result of comparison through the output module 4600. For example, the image management module 4110 may compare the first region of interest and the second region of interest, and may present information corresponding to the result of the comparison in association with the second region of interest.

For example, in the case in which the first image and the second image are person's images, when a difference between the relative arrangement of the feature points of a person in the first image and the relative arrangement of the feature points of a person in the second image is less than or equal to a designated error value, this may be reported to a user of the second electronic device 4001 through an operation, such as an image, a sound, and/or vibration, which corresponds to the matching of two images. Also, when the difference between the relative arrangement of the feature points of the person in the first image and the relative arrangement of the feature points of the person in the second image is greater than the designated error value, this may be reported to the user of the second electronic device 4001 through an operation, such as an image, a sound, and/or vibration, which corresponds to a mismatch of two images.

According to various embodiments of the present disclosure, the image management module 4110 may transmit, to the external electronic device, information corresponding to the result of comparison between the first region of interest and the second region of interest.

According to various embodiments of the present disclosure, the image management module 4110 may display indication information associated with the information, which is received from the external electronic device, through the display.

According to various embodiments of the present disclosure, an electronic device may include: a communication module for receiving a first image or metadata corresponding to the first image from an external electronic device of the electronic device; and an image management module that is embodiable as a processor, wherein the image management module may be configured to perform: displaying, through a display that is functionally connected with the electronic device, a second image obtained through a camera that is functionally connected with the electronic device; determining a change of a first region of interest of the first image; and changing a second region of interest of the second image based on the change, and displaying the same through the display.

According to various embodiments of the present disclosure, the metadata may be configured to include a plurality of feature points corresponding to the first image.

According to various embodiments of the present disclosure, the image management module may be configured to perform: setting a first area of the first image as the first region of interest when the metadata is first metadata; and setting a second area of the first image as the first region of interest when the metadata is second metadata.

According to various embodiments of the present disclosure, the image management module may be configured to generate a plurality of feature points from the first image.

According to various embodiments of the present disclosure, the image management module may be configured to perform: determining whether at least a portion of the first image is selected based on a user's action that is associated with the electronic device; setting the portion as the first region of interest when the selection exists; and setting the entire first image as the first region of interest when the selection does not exist.

According to various embodiments of the present disclosure, the image management module may be configured to perform: determining a plurality of feature points from the second image; selecting at least some feature points corresponding to the first region of interest from the plurality of feature points; and determining the second region of interest based on the at least some feature points.

According to various embodiments of the present disclosure, the image management module may be configured to perform: changing the second region of interest from a third area of the second image to a fourth area as the first region of interest is changed from a first area of the first image to a second area, wherein the third area corresponds to the first area and the fourth area corresponds to the second area.

According to various embodiments of the present disclosure, the image management module may be configured to simultaneously display the second image with the first image.

According to various embodiments of the present disclosure, the image management module may be configured to simultaneously display the second image of which the second region of interest is changed with the first image of which the first region of interest is changed.

According to various embodiments of the present disclosure, the image management module may be configured to perform: comparing the first region of interest and the second region of interest; and presenting, through the display, information corresponding to a result of the comparison in association with the second region of interest.

According to various embodiments of the present disclosure, the image management module may be configured to transmit the information to the external electronic device.

According to various embodiments of the present disclosure, the image management module may be configured to display, through the display, indication information associated with the information, which is received from the external electronic device.

According to various embodiments of the present disclosure, an electronic device may include: a communication module; an image management module that is embodiable as a processor, wherein the image management module may be configured to perform: obtaining a first image through a camera that is functionally connected with the electronic device; transmitting, through the communication module, the first image or metadata corresponding to the first image to an external electronic device of the electronic device; and receiving second image information corresponding to the first image from the external electronic device through the communication module.

According to various embodiments of the present disclosure, the image management module is configured to perform: determining a plurality of feature points from the first image; and including at least some feature points out of the plurality of feature points, as at least some of the metadata.

According to various embodiments of the present disclosure, the image management module may be configured to determine a region of interest of the first image based on at least some feature points out of the plurality of feature points.

According to various embodiments of the present disclosure, the image management module may be configured: to display the region of interest on the first image, or to include the region of interest in the metadata so that the external electronic device reproduces the region of interest.

According to various embodiments of the present disclosure, the image management module may be configured to perform: obtaining, from the second image information, information corresponding to a result of the comparison between the first region of interest of the first image and a second region of interest of the second image; and displaying the information in association with the first image through the display that is functionally connected with the electronic device.

According to various embodiments of the present disclosure, the image management module may be configured to transmit, to the external electronic device, indication information associated with the second image information that corresponds to the first image and is received from the external electronic device.

According to various embodiments of the present disclosure, the image management module may be configured to change a region of interest of the first image from a first area to a second area based on a region of interest of the second image information that corresponds to the first image and is received from the external electronic device, and may be configured to display the same.

According to various embodiments of the present disclosure, the image management module may be configured to broadcast the first image through the communication module.

Figure 8:
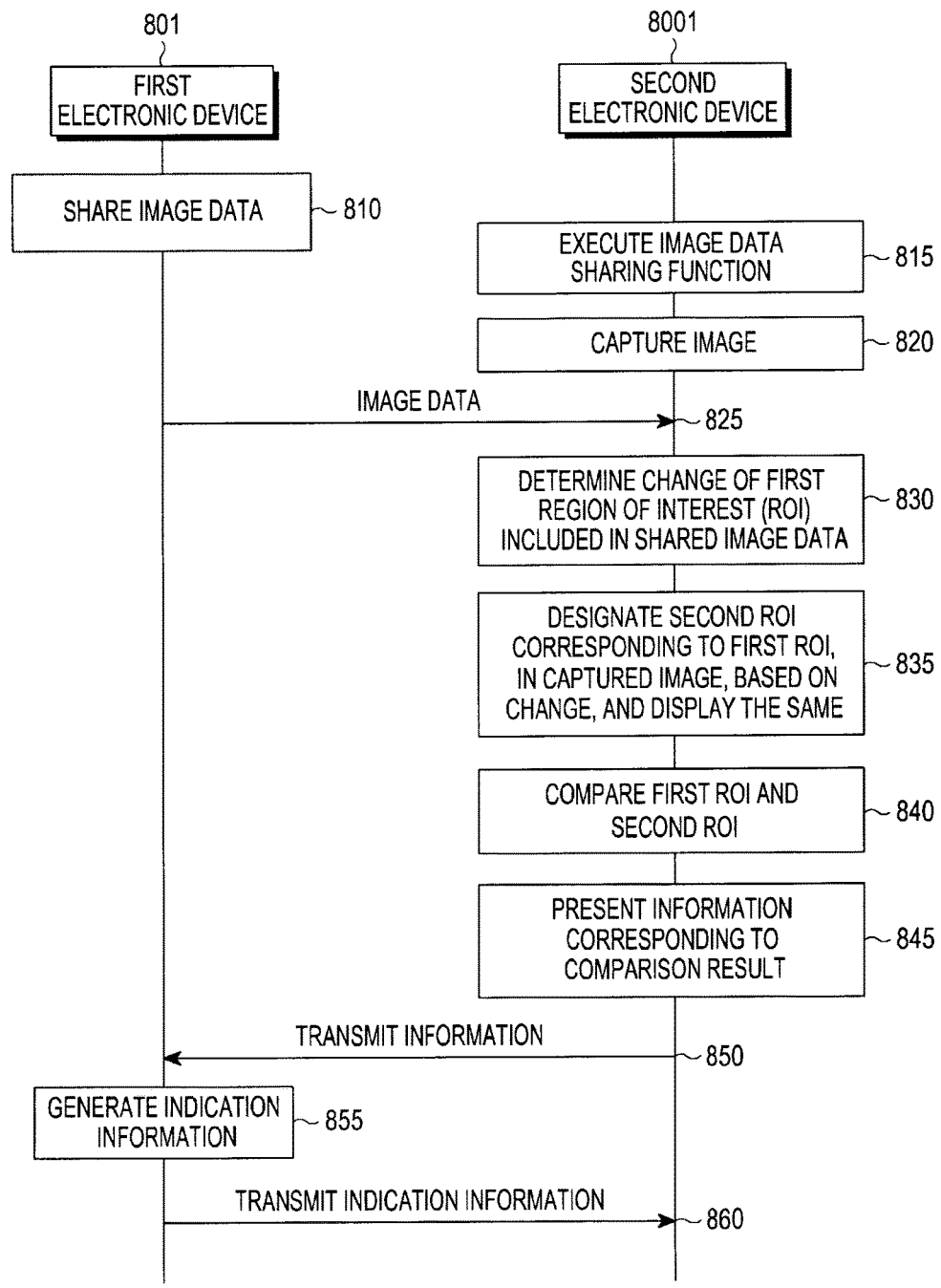
FIG. 8 is a flowchart of an example of a process, according to various embodiments of the present disclosure.

FIG. 8 is a flowchart of an example of a process, according to various embodiments of the present disclosure.

In operation 810, a first electronic device 801 (e.g., the first electronic device 401) begins sharing image data. The image sharing may correspond to initiating a broadcast. The initiation of the broadcast may be triggered by the first electronic device 801 executing a personal broadcasting service-dedicated application based on a user's operation, and selecting a designated broadcasting initiation menu from an execution screen displayed on a screen, so as to initiate a broadcast.

According to various embodiments of the present disclosure, the first electronic device 801 may provide a broadcast by shooting a broadcaster himself/herself or another predetermined person using a camera in real time.

In operation 815, a second electronic device 8001 (e.g., the second electronic device 4001) executes an image data sharing function. For example, the second electronic device may participate in the broadcast of the first electronic device 801 so as to watch the broadcast of the first electronic device 801. Alternatively, the second electronic device 8001 executes an image data reception function. For example, the second electronic device may join a communications session initiated by the first electronic device 801 so as to receive the shared image data from the first electronic device 801. For example, depending on a user's operation, the second electronic device 8001 may execute a personal broadcasting service-dedicated application, and may select the broadcast of the first electronic device 801 from the list of broadcasts in the personal broadcasting service-dedicated application displayed on a screen, so as to participate in the broadcast of the first electronic device 801.

In operation 820, the second electronic device 8001 captures an image through a camera. For example, the second electronic device 8001 may shoot a viewer side video from the viewer side through a camera.

According to various embodiments of the present disclosure, the second electronic device 8001 may cause a camera that is functionally connected with the second electronic device 8001 to be automatically activated when the second electronic device 8001 participates in a predetermined broadcast, and may enable the camera to be activated based on a user's operation. Also, the second electronic device 8001 may capture images of a viewer himself/herself or another predetermined person in real time using the camera that is functionally connected with the second electronic device 8001.

The second electronic device 8001 receives image data from the first electronic device 801 in operation 825, and the second electronic device 8001 determines the change of a first region of interest included in shared image data in operation 830.

According to various embodiments of the present disclosure, the image data may include metadata. The metadata may be generated when the first electronic device 801 detects the feature points of a first image by analyzing the first image corresponding to the image data through an image analysis technology, and generates information associated with the feature points of the first image. A region of interest of the first image may be determined by the second electronic device 8001 using metadata including the information associated with the feature points of the first image. Also, the second electronic device 8001 may detect the feature points of the first image by analyzing the first image through the image analysis technology, and may generate information associated with the feature points of the first image. Also, the region of interest of the first image may be determined by the second electronic device 8001 using the generated information associated with the feature points.

According to various embodiments of the present disclosure, when the first electronic device 801 zooms in on a predetermined area of an area while shooting the image, the first electronic device 801 may transmit, to the second electronic device 8001, information corresponding thereto by including the same in the metadata. The second electronic device 8001 that receives the same may determine the metadata, and may determine the change of a first region of interest included in the shared image data. The metadata may include the entire image that is not zoomed in and information associated with a part that is zoomed in. Additionally or alternatively, the metadata may include the information associated with the part that is zoomed in. Additionally or alternatively, the metadata may be the image of the part that is zoomed in.

According to various embodiments of the present disclosure, when a user of the second electronic device 8001 performs an input (e.g., a gesture, a line of sight, operating a key, a voice) selecting a predetermined area of the first image, the second electronic device 8001 may determine the change of the first region of interest by changing the first region of interest of the first image as the predetermined area.

In operation 835, the second electronic device 8001 designates and displays a second region of interest in the captured image (hereinafter, a second image), according to the change. As illustrated in FIGS. 11A-D and 12A-B, the second region of interest may be one that corresponds to the first region of interest.

According to various embodiments of the present disclosure, the operation of designating and displaying the second region of interest corresponding to the first region of interest in the second image may include: capturing a part corresponding to the region of interest of the first image by changing the state of the camera of the second electronic device 8001 (e.g., by zooming-in the camera); and displaying the part corresponding to the region of interest of the broadcasting image.

According to various embodiments of the present disclosure, the operation of designating and displaying the second region of interest corresponding to the first region of interest in the second image may include: detecting a part corresponding to the region of interest of the first image from the second image by the controller of the second electronic device 8001; and displaying the detected part.

According to various embodiments of the present disclosure, the second electronic device 8001 may generate the feature points of the second image that correspond to the feature points of the first image. Also, the operation of designating and displaying the second region of interest, which corresponds to the first region of interest, in the second image, may overlay the second image with a visual effect associated with the generated feature points, and may display the same. Also, the second image may be additionally overlaid with a visual effect associated with the feature points of the first image, and may be displayed.

In operation 840, the first region of interest and the second region of interest may be compared.

According to various embodiments of the present disclosure, whether the first image and the second image correspond to each other may be determined by comparing the information associated with the feature points of the first image and the second image. According to various embodiments of the present disclosure, when a difference between the location of the feature points of the first image and the location of the feature points of the second image is less than or equal to a designated error value, it is determined that the first image and the second image correspond to each other. Otherwise, it is determined that the first image and the second image do not correspond to each other.

In operation 845, the second electronic device 8001 presents information corresponding to the result of the comparison in association with the second region of interest. The information corresponding to the result of the comparison may be, for example, feedback information.

According to various embodiments of the present disclosure, the second electronic device 8001 may output the feedback information using at least one out of an image, a sound, and a vibration. According to various embodiments of the present disclosure, the feedback information may include at least a portion of the second image that corresponds to the second region of interest.

In operation 850, the second electronic device 8001 transmits the information indicating the result of the comparison to the first electronic device 801.

In operation 855, the first electronic device 8001 generates indication information. In some implementations, the indication information may be generated as discussed with respect to operation 1380 of FIG. 13. In operation 860, the first electronic device 801 transmits the indication information to the second electronic device 8001. According to various embodiments of the present disclosure, the first electronic device may automatically generate the indication information using the feedback information, or may generate the indication information by inputting the indication information according to a user's operation.

According to various embodiments of the present disclosure, the second electronic device 8001 that receives the indication information may output an image, a sound, and/or a vibration corresponding to the indication information.

Figure 9:
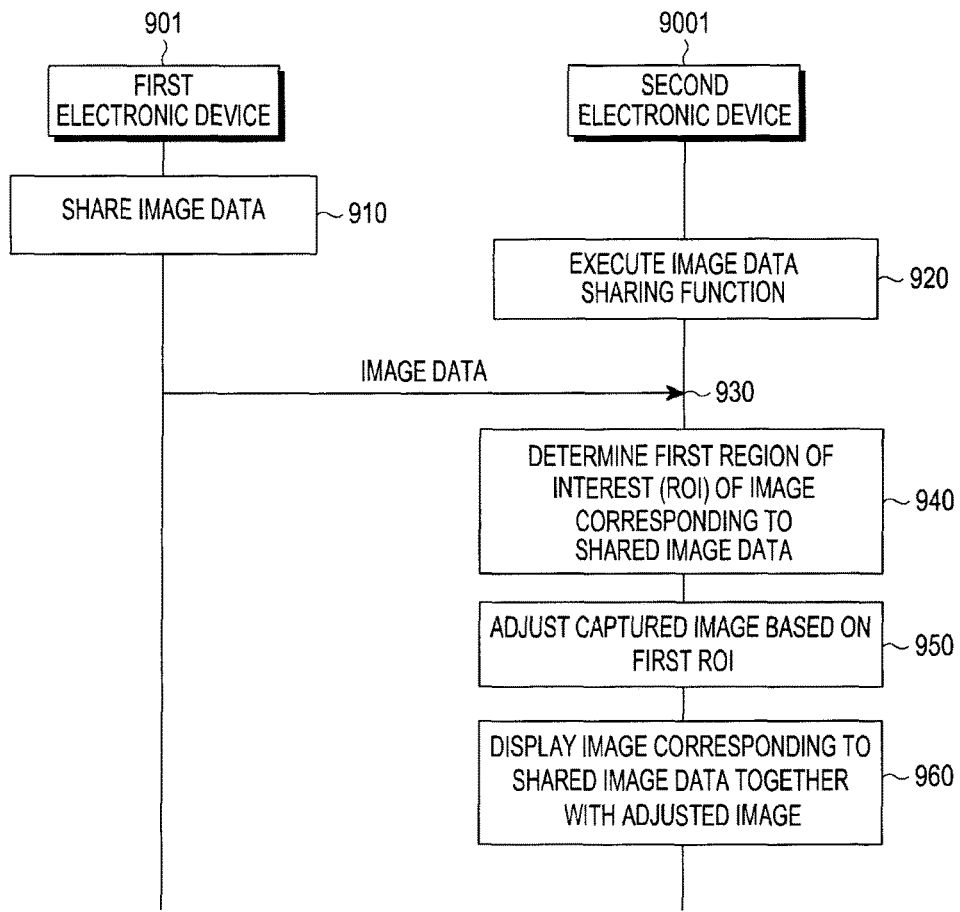
FIG. 9 is a flowchart of an example of a process, according to various embodiments of the present disclosure.

FIG. 9 is a flowchart of an example of a process, according to various embodiments of the present disclosure. Referring to FIG. 9, in operation 910, a first electronic device 901 (e.g., the first electronic device 401) begins sharing image data. For example, the electronic device 901 may initiates a broadcast.

For example, the first electronic device 901 may generate image data. For example, the image data may be broadcasting data. The broadcasting data may include a video stream generated by a camera through shooting a target to be broadcasted and/or may include metadata generated through an image management module of the first electronic device 901.

In operation 920, a second electronic device 9001 (e.g., the second electronic device 4001) executes an image data sharing function. For example, the second electronic device 9001 participates in the broadcast so that a user of the second electronic device 9001 watches the broadcast. Alternatively, the second electronic device 9001 executes an image data reception function. For example, the second electronic device 9001 may join a communications session initiated by the first electronic device 901 so as to receive the shared image data from the first electronic device 901.

In operation 930, the second electronic device 9001 receives image data (for example, a video stream and metadata) from the first electronic device 901.

In operation 940, the second electronic device 9001 determines a first region of interest of an image corresponding to shared image data. For example, when the image data is broadcasting data, the second electronic device 9001 may determine a region of interest (ROI) of a broadcasting image corresponding to video stream using metadata included in the broadcasting data.

In operation 950, the second electronic device 9001 adjusts an image (hereinafter referred to as a second image) that is captured by a camera that is functionally connected with the second electronic device 9001, based on the first region of interest. For example, the second electronic device 9001 may cause the camera to capture images of an area associated with the metadata and display the captured images on a screen. Additionally or alternatively, the second electronic device 9001 may control a media player application so that an area associated with the metadata is displayed on a screen.

In operation 960, the second electronic device 9001 displays the adjusted second image together with a first image corresponding to the shared image data. For example, when the image data is video data, the adjusted second image may be displayed together with a broadcasting image corresponding to a received video stream.

According to the above described operations of FIG. 9, the first electronic device 901 may share an image. In this instance, the first electronic device 901 may transmit a video stream and metadata corresponding to the video stream to the second electronic device 9001, which is a viewer side electronic device, in real time. The second electronic device 9001 may capture images (viewer side images) in real-time, while receiving the video data in real time, and may adjust the viewer side image and display the same in real time so that a part corresponding to the broadcasting image of the video stream is displayed using the metadata, together with the broadcasting image corresponding to the video stream that is displayed in real time.

Figure 10:
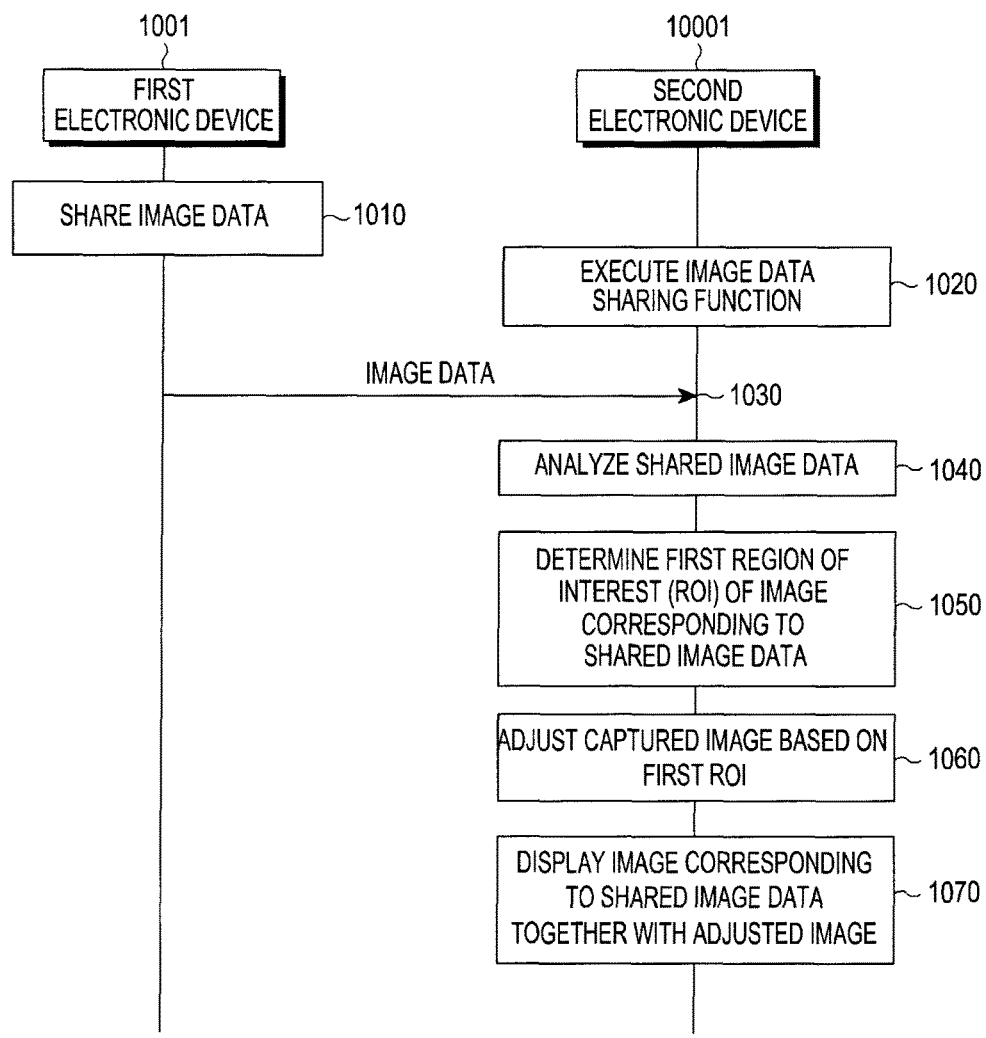
FIG. 10 is a flowchart of an example of a process, according to various embodiments of the present disclosure.

FIG. 10 is a flowchart of an example of a process, according to various embodiments of the present disclosure. Referring to FIG. 10, in operation 1010, a first electronic device 1001 (e.g., the first electronic device 401) may begin sharing image data.

For example, the first electronic device 1001 may generate image data and broadcast the generated image data. The image data may include a video stream that is captured by a camera that is part of (or otherwise connected to) the electronic device 1001.

In operation 1020, a second electronic device 10001 (e.g., the second electronic device 4001) executes an image data sharing function. For example, the second electronic device 10001 participates in the broadcast so that a user of the second electronic device 10001 watches the broadcast. Alternatively, the second electronic device 10001 executes an image data reception function. For example, the second electronic device 10001 may join a communications session initiated by the first electronic device 1001 so as to receive the shared image data from the first electronic device 1001.

In operation 1030, the second electronic device 10001 receives image data (e.g., a video stream) from the first electronic device 1001.

In operation 1040, the second electronic device 10001 analyzes shared image data. For example, the second electronic device 10001 may analyze image data using an image management module of the second electronic device 10001, and may generate the metadata of an image corresponding to the image data. The image data may be, for example, a video stream, and the second electronic device 10001 may generate metadata corresponding to the video stream by analyzing the video stream.

In operation 1050, the second electronic device 10001 determines a first region of interest of an image corresponding to the shared image data. For example, when the image data is a video stream, the second electronic device 10001 may determine a region of interest of a broadcasting image corresponding to the video stream based on the analysis of the video stream.

In operation 1060, the second electronic device 10001 adjusts an image that is captured by a camera module that is functionally connected with the second electronic device 10001 based on the first region of interest.

In operation 1070, the second electronic device 10001 displays the adjusted image together with the image corresponding to the shared image data. For example, when the image data is a video stream, the adjusted image may be displayed together with a broadcasting image corresponding to the video stream.

According to the above described operations of FIG. 10, the first electronic device 1001 may share an image. In this instance, the first electronic device 1001 may transmit video data including a video stream to the second electronic device 10001, which is a viewer side electronic device, in real time. The second electronic device 10001 may capture images (viewer side images) in real-time, while receiving the video data in real time, and may adjust the viewer side image and display the same so that a part corresponding to the broadcasting image of the video stream is displayed using an image management module, together with the broadcasting image corresponding to the video stream that is displayed.

FIGS. 11A-D and 12A-B are diagrams illustrating a screen displayed based on an operation of an image sharing service according to various embodiments of the present disclosure. Referring to FIGS. 11A-D and 12A-B, according to the above described operation of the image sharing service, a first electronic device (e.g., the first electronic device 401) broadcasts a fitness lesson in which a fitness coach shows how to perform sit-ups. A viewer may watch the fitness lesson and attempt to perform sit-ups in the manner shown in the fitness lesson. The viewer may watch the fitness lesson on at least one second electronic device (e.g., the second electronic device 4001) that receives the broadcast.

Figure 11A:
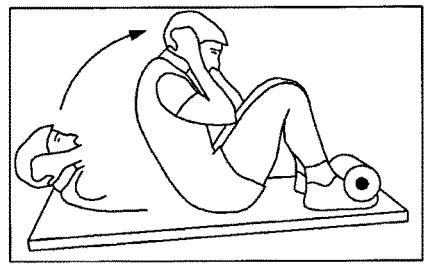
FIG. 11A is a diagram of an example of a screen that can be displayed by an image sharing service, according to various embodiments of the present disclosure.
Figure 11C:
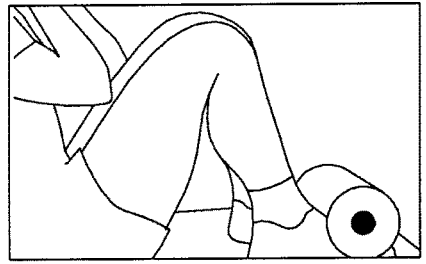
FIG. 11C is a diagram of an example of a screen that can be displayed by an image sharing service, according to various embodiments of the present disclosure.
Figure 11B:
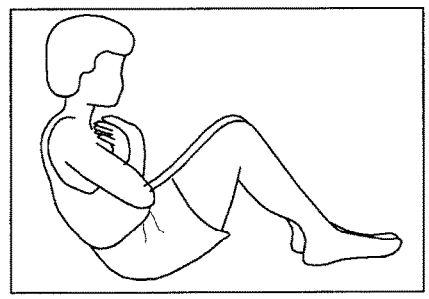
FIG. 11B is a diagram of an example of a screen that can be displayed by an image sharing service, according to various embodiments of the present disclosure.

Referring to FIGS. 11A-D, when the first electronic device (e.g., the first electronic device 401) captures and broadcasts a motion demonstrated by the fitness coach, in real time through a camera module, the first electronic device may display, on a screen, a broadcasting image as shown in FIG. 11A. Also, when the first electronic device transmits broadcasting data corresponding to the captured demonstrated motion, the second electronic device (e.g., the second electronic device 4001) which is a viewer side electronic device, may determine the entire body of the fitness coach as a region of interest of the broadcasting image, and may display a viewer side image obtained by shooting the entire body of a viewer as shown in FIG. 11B.

Also, the second electronic device may display the broadcasting image of FIG. 11A together with the viewer side image of FIG. 11B.

Figure 11D:
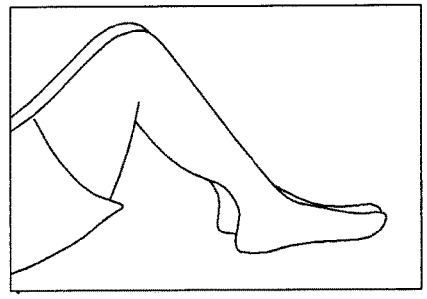
FIG. 11D is a diagram of an example of a screen that can be displayed by an image sharing service, according to various embodiments of the present disclosure.

Also, when the first electronic device captures a predetermined part of the body of the fitness coach by zooming in (or tilting) on the predetermined part using a camera module based on a user's operation so as to accurately show the motion demonstrated by the fitness coach, the first electronic device may display, on a screen, a broadcasting image as shown in FIG. 11C. Also, the first electronic device may transmit, to the second electronic device, broadcasting data corresponding to the captured broadcasting image of the FIG. 11C. The second electronic device that receives the broadcasting data may determine a predetermined part of the body of the fitness coach (for example, the lower half of the body of the fitness coach) to be a region of interest of the broadcasting image. Also, the second electronic device may shoot the lower half of the body of the student which corresponds to the region of interest, using a camera module, or may detect (or extract) the lower half of the body of the student that corresponds to the region of interest from an image captured by the camera module, and may display a viewer side image as shown in FIG. 11D. Also, the second electronic device may display, on the screen, the broadcasting image of the fitness coach of FIG. 11C together.

In some implementations, the electronic device may detect an input performed by the student (e.g., a gesture, a line of sight, operating a key, and a voice) that designates a particular portion of the broadcast image as a first region of interest. In response to the input, the second electronic device may select a predetermined area of the image(s) of the student corresponding to the portion of the broadcast image, and may display, on a screen, the same together with the region of interest of the broadcasting image.

Figure 12A:
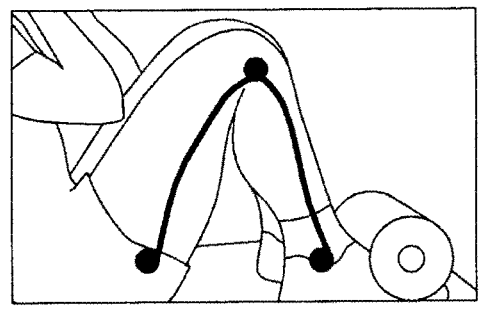
FIG. 12A is a diagram of an example of a screen that can be displayed by an image sharing service, according to various embodiments of the present disclosure.
Figure 12B:
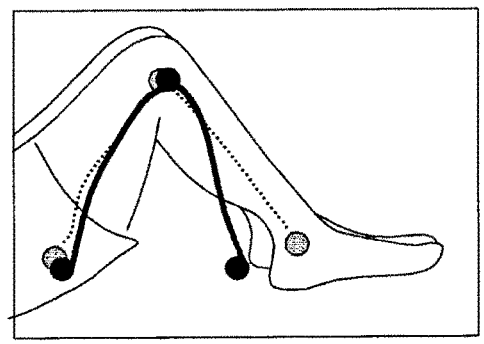
FIG. 12B is a diagram of an example of a screen that can be displayed by an image sharing service, according to various embodiments of the present disclosure.

Referring to FIGS. 12A-B, when a first electronic device (e.g., the first electronic device 401) captures a predetermined part of the body of a fitness coach by zooming in on the predetermined part using a camera module based on a broadcaster side user's operation, the first electronic device may display, on a screen, a broadcasting image as shown FIG. 12A. For example, the first electronic device detects the feature points of the predetermined part of the body of the fitness coach, overlays the predetermine part of the body of the fitness coach with a visual effect corresponding to the feature points as shown in FIG. 12A, and may display the same. Also, when the first electronic device captures the predetermined part of the body of the fitness coach, the first electronic device may transmit broadcasting data corresponding to the captured predetermined part to a second electronic device (e.g., the second electronic device 4001). The second electronic device that receives the broadcasting data may shoot a predetermined part of the body of a student that corresponds to the predetermined part of the body of the fitness coach using a camera module, or may detect a predetermined part of the student that correspond to the predetermined part of the body of the fitness coach from an image captured by the camera module, and may display a viewer side image as shown in FIG. 12B. Also, the second electronic device detects the feature points of the predetermined part of the body of the student, overlays the predetermined part of the body of the student with a visual effect corresponding to the feature points of the body of the student, and displays the same as shown in FIG. 12B. Also, the predetermined part of the body of the student may be overlaid with a visual effect corresponding to the feature points of the predetermined part of the body of the fitness coach, and may be displayed as shown in FIG. 12B. For example, the visual effect corresponding to the feature points of the predetermined part of the body of the student and the visual effect corresponding to the feature points of the predetermined part of the body of the fitness coach are set to be distinguished from each other. Accordingly, the student who watches the broadcast of the fitness coach may repeat after the posture of the fitness coach. In this instance, the student may determine whether the student's posture is proper by watching the screen of the second electronic device.

Also, referring to FIGS. 12A-B, when the posture of the fitness coach corresponds to the posture of the student (that is, when the posture of the fitness coach and the posture of the student are similar to each other), this may be reported to the student. For example, as illustrated in FIG. 12B, when the predetermined part of the body of the student is overlaid with a visual effect corresponding to the feature points of the predetermined part of the body of the student (e.g., the dotted line connecting different joints of the user) and a visual effect corresponding to the feature points of the predetermined part of the body of the fitness coach (e.g., the solid line), and is displayed on a screen, the student may determine whether his/her posture is proper by watching the screen. As illustrated in FIG. 12B, when it is determined that the visual effect corresponding to the feature points of the predetermined part of the body of the student and the visual effect corresponding to the feature points of the predetermined part of the body of the fitness coach are located in different positions, the student may recognize that his/her posture is improper through the screen. Accordingly, the student may move the predetermined part of the body, and when the movement leads to a proper posture in which the predetermined part of the body of the student corresponds to the predetermined part of the body of the fitness coach (e.g., when the predetermined part of the body of the student matches a posture that is displayed in a broken line), the second electronic device may report to the student that the postures are matched properly through various operations, such as an image, a sound, a vibration, and the like.

Figure 13:
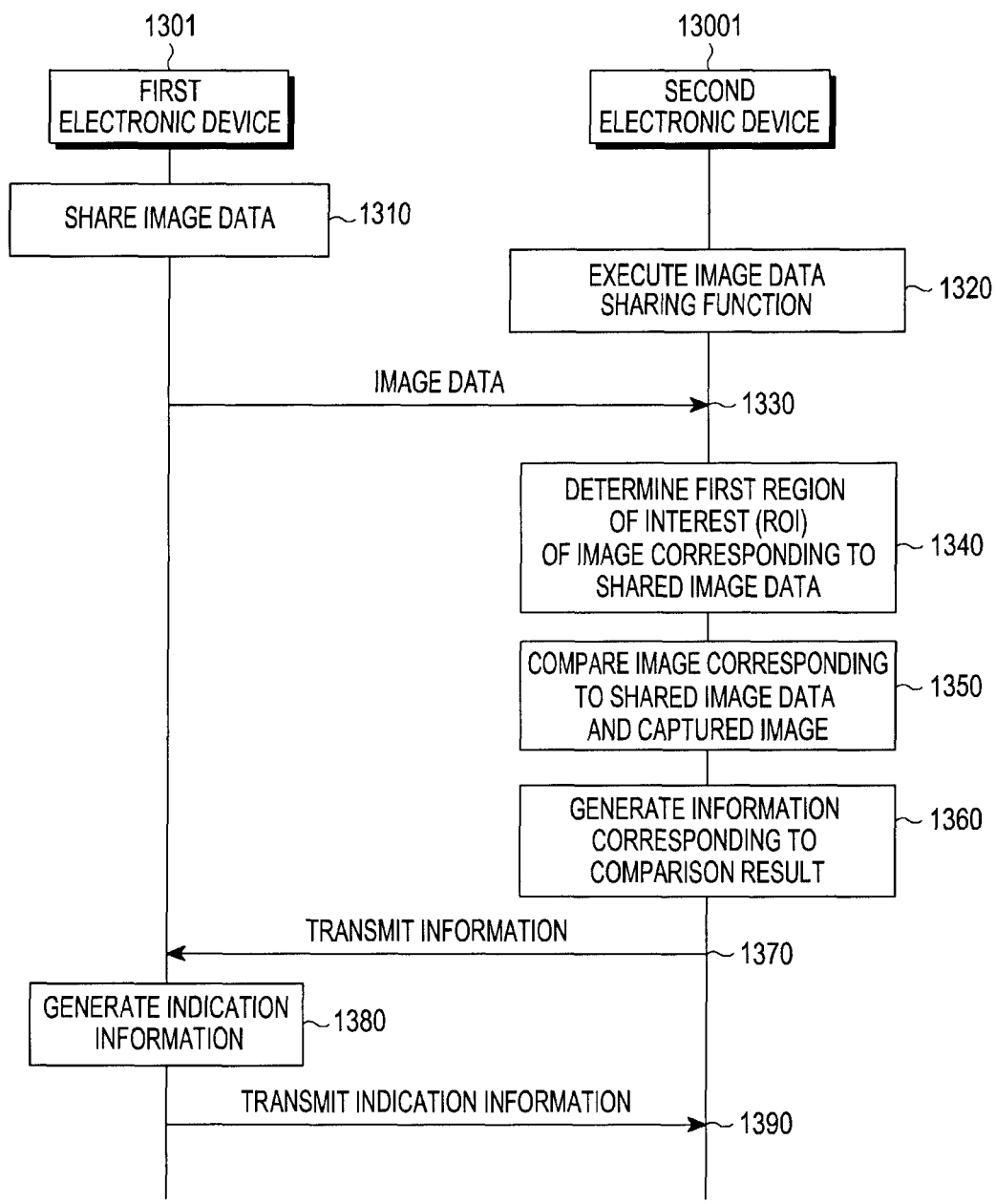
FIG. 13 is a flowchart of an example of a process, according to various embodiments of the present disclosure.

FIG. 13 is a flowchart of an example of a process, according to various embodiments of the present disclosure.

In operation 1310, a first electronic device 1301 (e.g., the first electronic device 401) begins sharing image data. For example, the first electronic device 1301 initiates a broadcast.

For example, the first electronic device 1301 may generate image data. For example, the image data may be broadcasting data. The broadcasting data may include a video of a target to be broadcasted and/or metadata generated by an image management module of the first electronic device 1301.

In operation 1320, a second electronic device 13001 (e.g., the second electronic device 4001) executes an image data sharing function. For example, the second electronic device 13001 participates in the broadcast so that a user of the second electronic device 13001 watches the broadcast. Alternatively, the second electronic device 13001 executes an image data reception function. For example, the second electronic device 13001 may join a communications session initiated by the first electronic device 1301 so as to receive the shared image data from the first electronic device 1301.

In operation 1330, the second electronic device 13001 receives image data (for example, a video stream and metadata) from the first electronic device 1301.

In operation 1340, the second electronic device 13001 determines a first region of interest of an image corresponding to shared image data. For example, when the image data is broadcasting data, the second electronic device 13001 may determine, using the metadata, a region of interest of a broadcasting image corresponding to the video stream.

In operation 1350, the second electronic device 13001 compares an image corresponding to the shared image data and an image that is captured by a camera that is functionally connected with the second electronic device 13001.

For example, when the image data is broadcasting data, a broadcasting image corresponding to a received video stream and the captured image may be compared. For example, the second electronic device 13001 may be equipped with an image management module, and the second electronic device 13001 may extract the feature points of the captured image and may generate information associated with the feature points so as to generate metadata. For example, the result of the comparison between the broadcasting image and the captured image may indicate a difference in the information associated with the feature points, which is obtained by comparing the information associated with the feature points between the broadcasting image and the captured image (that is, a difference in metadata).

Also, the result of the comparison between the broadcasting image and the captured image may indicate whether the broadcasting image and the captured image correspond to each other, which is determined based on the information associated with the feature points included in the received metadata and the generated information associated with the feature points. For example, the information associated with the feature points may include IDs and location information of the feature points. Accordingly, the difference in the information associated with the feature points between the broadcasting image and the captured image may be determined by comparing the locations of the feature points of the broadcasting image and the captured image. As described above, whether the broadcasting image and the captured image correspond to each other may be determined by determining whether the determined difference in the information associated with the feature points is less than, or equal to, a designated threshold.

In operation 1360, the second electronic device 13001 generates information corresponding to the result of the comparison. In operation 1370, the second electronic device 13001 transmits information corresponding to the result of the comparison to the first electronic device 1301. The information corresponding to the result of the comparison may be, for example, feedback information. For example, the feedback information may include the determined difference in the information associated with the feature points. Also, the feedback information may include the information associated with the feature points included in the received metadata and the generated information associated with the feature points. Also, the feedback information may include information indicating that the broadcasting image and the captured image correspond to each other, or the feedback information may include information indicating that the broadcasting image and the captured image do not correspond to each other.

In operation 1380, the first electronic device 1301 generates indication information. For example, the indication information may indicate the result of the comparison (for example, information that the first electronic device 1301 automatically generates based on the feedback information) or may be information input by a broadcaster side user who is presented with the feedback information.

In operation 1390, the first electronic device 1301 transmits the indication information to the second electronic device 13001. In the above described operation, the first electronic device 1301 may establish a separate one-to-one communication session with the second electronic device 13001.

Additionally or alternatively, the first electronic device 1301 may receive new feedback information from the second electronic device 13001, and may display a visual effect corresponding to the indication information and/or a visual effect corresponding to the new feedback information in a separate window that is displayed when the one-to-one communication session is established.

The one-to-one communication session, for example, may enable the first electronic device to transmit indication information to only the second electronic device 13001 without displaying a separate window. The indication information may include, for example, an image, a character and/or a voice. For example, the first electronic device may receive characters input through an application corresponding to an image sharing service according to a user's operation, and may transmit the input characters to only the designated second electronic device 13001, so that the input characters are displayed through the application corresponding to the image sharing service of the second electronic device 13001.

According to the above described operations of FIG. 13, the first electronic device 1301 may initiate an image sharing service. In this instance, the first electronic device 1301 may transmit video data including a video stream and metadata corresponding to the video stream to the second electronic device 13001 (e.g., the second electronic device 4001) which is a viewer side electronic device, in real time. The second electronic device 13001 may capture a viewer side video in real-time as it receives the video data from the first electronic device 1301. The second electronic device 13001 may be equipped with an image management module so that the second electronic device 13001 may compare the captured viewer side video and a broadcasting image of the video stream by analyzing the image of the captured viewer side video and may determine whether two images correspond to each other. Based on the determination indicating whether they correspond to each other, the second electronic device 13001 may transmit feedback information to the first electronic device 1301, and may receive indication information with respect to the feedback information from the first electronic device 1301.

Figure 14:
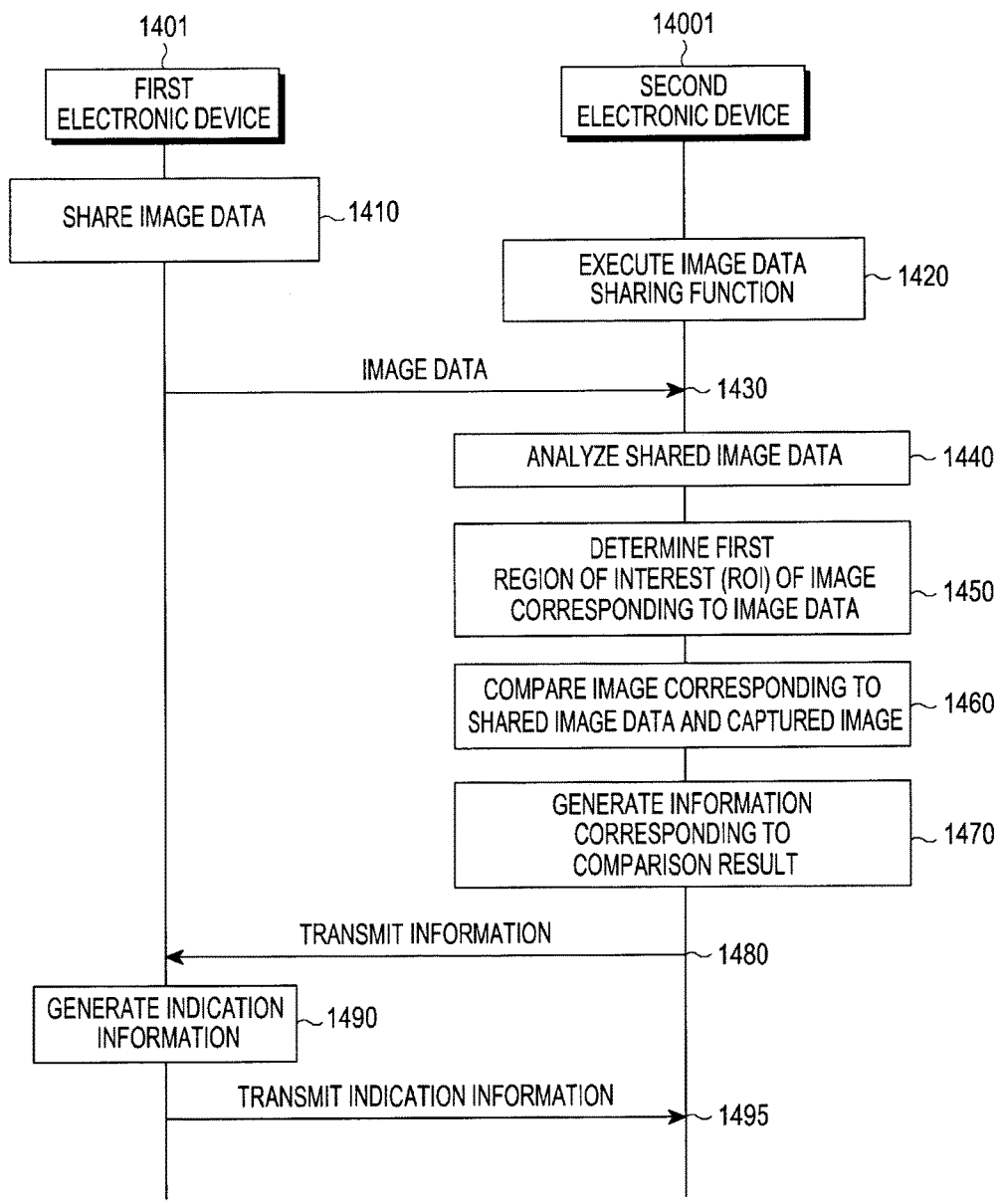
FIG. 14 is a flowchart of an example of a process, according to various embodiments of the present disclosure.
Figure 15:
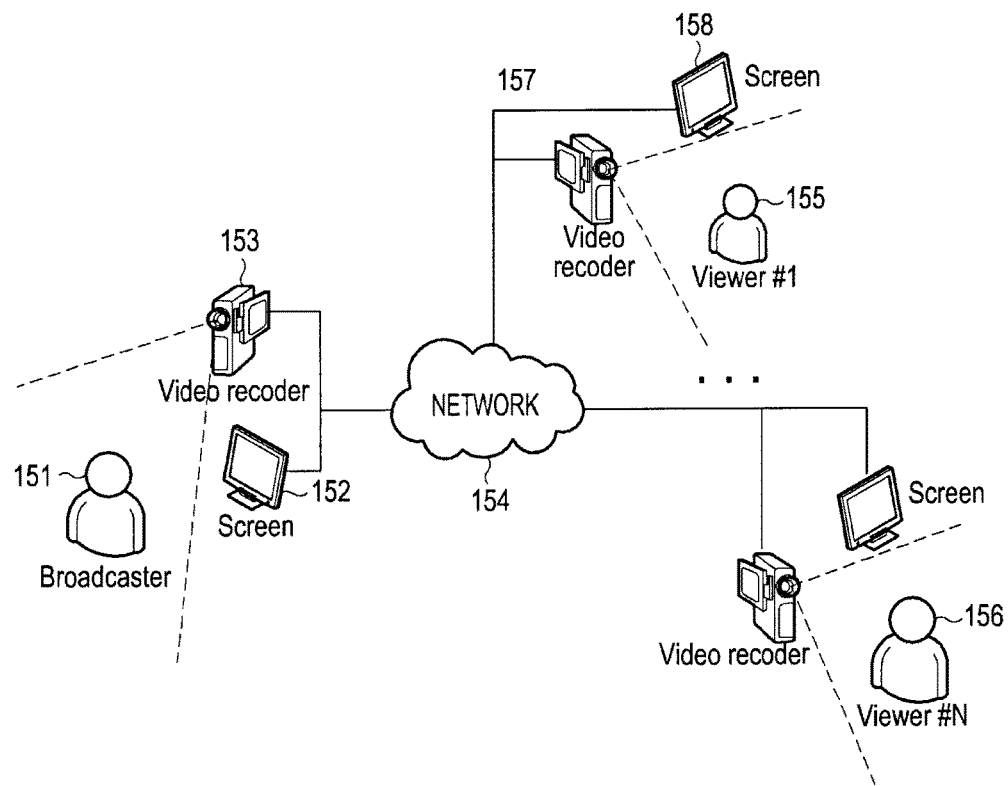
FIG. 15 illustrates an example of a conventional image sharing system.
Figure 16:
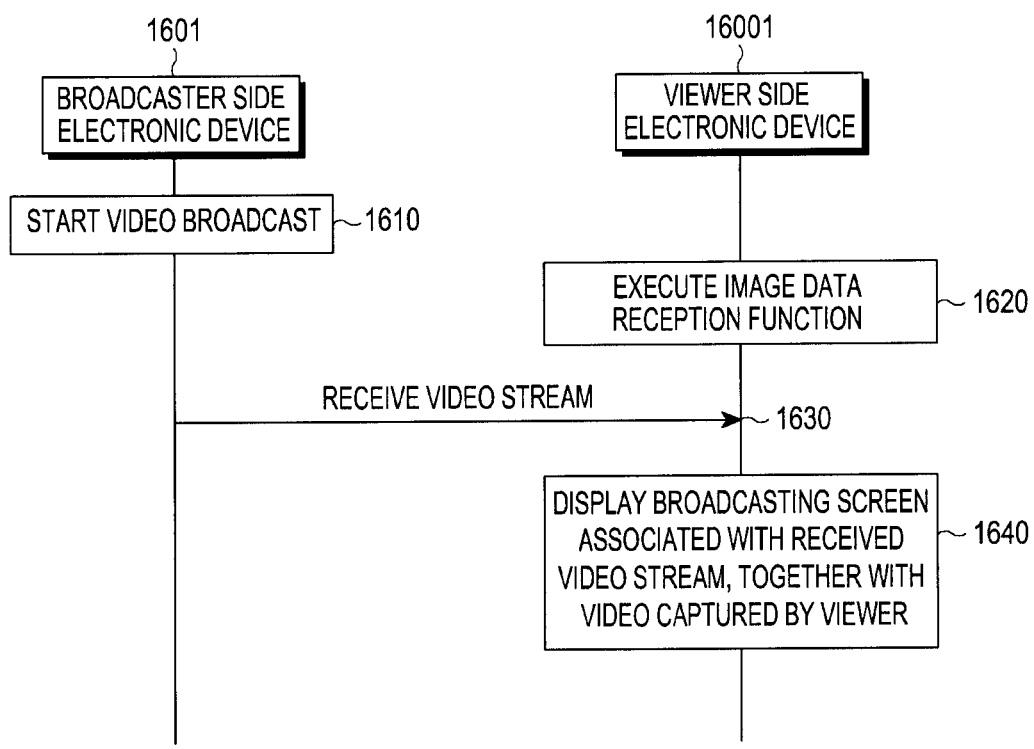
FIG. 16 is a flowchart of an example of a process performed by a conventional image sharing system.

FIG. 14 is a flowchart of an example of a process, according to various embodiments of the present disclosure. Referring to FIG. 14, in operation 1410, a first electronic device 1401 (e.g., the first electronic device 401) begins sharing image data. For example, the first electronic device 1401 initiates a broadcast.

For example, the first electronic device 1401 may generate image data. For example, the image data may be broadcasting data. The broadcasting data may include a video stream that is generated by a camera through shooting a target to be broadcasted.

In operation 1420, the second electronic device 14001 executes an image data sharing function. For example, the second electronic device 14001 participates in the broadcast so that a user of the second electronic device 14001 watches the broadcast. Alternatively, the second electronic device 14001 executes an image data reception function. For example, the second electronic device 14001 may join a communications session initiated by the first electronic device 1401 so as to receive the shared image data from the first electronic device 1401.

In operation 1430, the second electronic device 14001 receives image data (for example, a video stream) from the first electronic device 1401.

In operation 1440, the second electronic device 14001 analyzes shared image data. For example, when the image data is broadcasting data, the second electronic device 14001 may analyze a video stream using an image management module of the second electronic device 14001.

In operation 1450, the second electronic device 14001 determines a first region of interest of an image corresponding to the image data. For example, when the image data is broadcasting data, the second electronic device 14001 may determine a region of interest of a broadcasting image corresponding to a video stream, based on the analysis of the video stream.

In operation 1460, the second electronic device 14001 compares an image corresponding to the shared image data and an image that is captured by a camera that is functionally connected with the second electronic device 14001. For example, when the image data is broadcasting data, the second electronic device 14001 may compare a broadcasting image corresponding to the video stream and the captured image.

In operation 1470, the second electronic device 14001 generates information corresponding to the result of the comparison. In operation 1480, the second electronic device 14001 transmits information corresponding to the result of the comparison to the first electronic device 1401. The information corresponding to the result of the comparison may be, for example, feedback information.

In operation 1490, the first electronic device 1401 generates indication information. In some implementations, the indication information may be generated as discussed with respect to operation 1380 of FIG. 13.

In operation 1495, the first electronic device 1401 transmits the indication information to the second electronic device 14001.

The first electronic device 1401 may provide an image sharing service in real time. In this instance, the first electronic device 1401 may transmit video data including a video stream to the second electronic device 14001 which is a viewer side electronic device, in real time. The second electronic device 14001 may shoot a viewer side image in real time while receiving the video data in real time, and may be equipped with an image management module so that the second electronic device 14001 may compare the captured viewer side image and a broadcasting image of the video stream by analyzing an image corresponding to the received video stream and the captured viewer side image. Based on the comparison, the second electronic device 14001 may transmit feedback information to the first electronic device 1401, and may receive indication information associated with the feedback information from the first electronic device 1401.

According to the operations of FIGS. 13 and 14, for example, when a fitness coach provides a broadcast associated with exercise in real time, the fitness coach may provide only a viewer who does not do well at repeating the motion of the fitness coach with personal training through a separate one-to-one communication session. Accordingly, this may guard a viewer's privacy. Also, the viewer who watches the broadcasting image of the fitness coach may designate different regions of interest. Accordingly, the fitness coach may provide the viewers with different feedbacks.

Referring to the drawings of the above described embodiments, although it is illustrated that a first electronic device transmits broadcasting data to only a second electronic device, the first electronic device according to various embodiments of the present disclosure may transmit broadcasting data simultaneously to a plurality of electronic devices in real time.

Although the first electronic device transmits a broadcasting image (or a video stream) in the above described embodiment, according to various embodiments of the present disclosure, the first electronic device may transmit only metadata (e.g., skeletal structure information), and the second electronic device overlays an image that the second electronic device captures and displays with the feature points of the metadata, and displays the same. Accordingly, the transmission of a broadcasting image may be relatively efficient from the perspective of a network bandwidth. The effect may increase as the number of frames of the broadcasting image increases. Also, according to various embodiments of the present disclosure, the first electronic device transmits only metadata corresponding to a broadcasting image, and the second electronic device may change the motion of a designated avatar using the metadata instead of a broadcasting image (or may generate an avatar using the metadata), and may display the same in the second electronic device.

According to the above described embodiment of the present disclosure, a system for an image sharing service may include a first electronic device and a second electronic device, and the communication of information (e.g., broadcasting data, feedback information, and indication information) executed between the first electronic device and the second electronic device has been described in association with the operations of the system for the image sharing service. The first electronic device and the second electronic device may have various constraints (e.g., a battery constraint, a processing power constraint, and the like). In the case of a server, the number of constraints may be relatively small. Therefore, according to various embodiments of the present disclosure, the system for an image sharing service may further include a server (not illustrated). The server may enable the first electronic device and the second electronic device to communicate information to each other through the server, and some of the above described operations of the first electronic device and/or second electronic device may be performed by the server. For example, the server may determine a region of interest of a broadcasting image included in broadcasting data, and may compare the broadcasting image and a viewer side image. Also, the server may generate feedback information, and may generate indication information.

For example, when the first electronic device provides a fitness broadcast, the server may compare the broadcasting image and the viewer side image so as to evaluate whether a viewer of each reception side electronic device that receives broadcasting data corresponding to the fitness broadcast repeats well after the motion of the fitness broadcasting coach. Also, the ranking of the viewers may be determined based on the evaluation. Through the above, the server may filter only some viewers and may determine target electronic devices to which the first electronic device needs to provide indication information.

Although descriptions have been provided using the case in which an image sharing service is applied to a fitness broadcast according to the above described embodiment of the present disclosure, the image sharing service may be applied to various fields, such as an instrument lesson, a cooking lesson, a drawing lesson, a designing lesson, a game broadcast, a sport lesson, and the like.

In the case of the instrument lesson, generally, the instruments are played with hands, and each skeletal structure of a hand and the gesture of a hand may be readily detected. According to the above described operations, a guitar lesson broadcast may be broadcasted to show the entire figure of a guitar lesson teacher on a screen, and then, to show some of the entire feature. For example, the guitar lesson teacher may focus on a predetermined part of a guitar while teaching instrumental music. For example, only the neck portion of the guitar may be shown or only the sound hole portion may be shown. Students who watch the images may efficiently learn to play a guitar through the operations according to the above described various embodiments of the present disclosure. This may be applied to all instrument lesson broadcasts, such as a piano lesson, a flute lesson, a violin lesson, or the like, in addition to the guitar lesson. Also, according to an operation such as zooming in of a camera module in the above described operations, equipment such as a microphone and the like may be additionally beam formed with respect to a predetermined part on which the camera module focuses. For example, the microphone may focus on the predetermined part on which the camera module focuses, may accurately record the sound of the part, and may transmit the same to a reception side electronic device.

The operations of the image sharing service, according to various embodiments of the present disclosure, may be also applied to the cooking lesson, the drawing lesson, and the designing lesson. For example, in the cooking lesson broadcast, the entire figure of a cooking teacher is shown on a screen, and when the cooking teacher runs a knife, the broadcast may be provided by focusing on a hand portion. In this instance, a viewer side electronic device may automatically focus on the hand portion of the viewer. Also, for example, when water is boiling, the temperature of the water may be important. The temperature may be measured by an infrared sensor of a broadcaster side electronic device and/or infrared camera or the like, and may be included in metadata. The metadata may be transmitted to the viewer side electronic device. The drawing lesson broadcast and the designing lesson broadcast may be performed in the similar manner to the cooking lesson broadcast.

In the case of the game broadcast, the operations of the image sharing service, according to above described various embodiments of the present disclosure, may be applied. Conventional game devices, such as x-box of Microsoft corporation, playstation of Sony corporation, and the like may support a game image and a broadcasting function. According to various embodiments of the present disclosure, a broadcaster side electronic device may generate metadata using an image captured by a camera module (a general camera, a Kinect camera, and the like) or information input through a joypad or joystick of a game device. Also, through the operations according to above described various embodiments of the present disclosure, an operating skill of performing a predetermined function or technique in association with a game may be effectively transmitted.

The operations according to above described various embodiments of the present disclosure may be also applied to the sport lesson. For example, in the case of exercise that utilizes equipment, angle information of the equipment may be important. The detection of feature points in the above described embodiment may be extended and applied to the equipment.

In addition, the above described various embodiments of the present disclosure may be applied even when stored contents are broadcasted in addition to a live broadcast.

According to various embodiments of the present disclosure, a method of an electronic device may include: receiving a first image and metadata corresponding to the first image from an external electronic device of the electronic device; displaying a second image obtained through a camera that is functionally connected with the electronic device through a display that is functionally connected with the electronic device; determining a change of a first region of interest of the first image; and changing a second region of interest of the second image based on the change, and display the same through the display.

According to various embodiments of the present disclosure, the metadata may include a plurality of feature points corresponding to the first image.

According to various embodiments of the present disclosure, the method may include: setting a first area of the first image as the first region of interest when the metadata is first metadata; and setting a second area of the first image as the first region of interest when the metadata is second metadata.

According to various embodiments of the present disclosure, the method may include: generating a plurality of feature points from the first image.

According to various embodiments of the present disclosure, the method may include: determining whether at least a portion of the first image is selected based on a user's action that is associated with the electronic device; setting the portion as the first region of interest when the selection exists; and setting the entire first image as the first region of interest when the selection does not exist.

According to various embodiments of the present disclosure, the method may include: determining a plurality of feature points from the second image; selecting at least some feature points corresponding to the first region of interest from the plurality of feature points; and determining the second region of interest based on the at least some feature points.

According to various embodiments of the present disclosure, the method may further include: changing the second region of interest from a third area of the second image to a fourth area as the first region of interest is changed from a first area of the first image to a second area, wherein the third area corresponds to the first area; and the fourth area corresponds to the second area.

According to various embodiments of the present disclosure, the method may include: displaying the second image simultaneously with the first image.

According to various embodiments of the present disclosure, the method may include: displaying the second image of which the second region of interest, simultaneously with the first image of which the first region of interest is changed.

According to various embodiments of the present disclosure, the method may include: comparing the first region of interest and the second region of interest; and presenting, through the display, information corresponding to a result of the comparison in association with the second region of interest.

According to various embodiments of the present disclosure, the method may include: transmitting the information to the external electronic device.

According to various embodiments of the present disclosure, the method may include: displaying, through the display, indication information associated with the information, which is received from the external electronic device.

According to various embodiments of the present disclosure, there may be provided a machine-readable recording medium that stores a program for an image sharing service of an electronic device, the program including: receiving a first image and metadata corresponding to the first image from an external electronic device of the electronic device; displaying a second image obtained through a camera that is functionally connected with the electronic device through a display that is functionally connected with the electronic device; determining a change of a first region of interest of the first image; and changing a second region of interest of the second image based on the change, and displaying the same through the display.

According to various embodiments of the present disclosure, a method of an electronic device may include: obtaining a first image through a camera that is functionally connected with the electronic device; transmitting the first image or metadata corresponding to the first image to an external electronic device of the electronic device; and receiving, from the external electronic device, second image information corresponding to the first image.

According to various embodiments of the present disclosure, the method may include: determining a plurality of feature points from the first image; and including at least some feature points out of the plurality of feature points as at least some of the metadata.

According to various embodiments of the present disclosure, the method may include: determining a region of interest of the first image based on at least some feature points out of the plurality of feature points.

According to various embodiments of the present disclosure, the method may include: displaying the region of interest on the first image or including the region of interest in the metadata to enable the external electronic device to reproduce the region of interest.

According to various embodiments of the present disclosure, the method may include: obtaining, from the second image information, information corresponding to a result of the comparison between a first region of interest of the first image and a second region of interest of the second image; and displaying the information in association with the first image through the display that is functionally connected with the electronic device.

According to various embodiments of the present disclosure, the method may include: transmitting, to the external electronic device, indication information associated with the second image information that corresponds to the first image and is received from the external electronic device.

According to various embodiments of the present disclosure, the method may include: changing a region of interest of the first image from a first area to a second area based on a region of interest of the second image information that corresponds to the first image and is received from the external electronic device, and displaying the same.

According to various embodiments of the present disclosure, the method may include: broadcasting the first image.

According to various embodiments of the present disclosure, there may be provided a machine-readable recording medium that stores a program for an image sharing service of an electronic device, the program including: obtaining a first image through a camera that is functionally connected with the electronic device; transmitting the first image or metadata corresponding to the first image to an external electronic device of the electronic device; and receiving, from the external electronic device, second image information corresponding to the first image.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added. Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. § 101 and does not constitute software per se.

What is claimed is:

1. An electronic device, comprising:
a memory;
a display; and
at least one processor operably coupled with the memory, configured to:
receive, from an external electronic device, a first image,
acquire a second image by using a camera operably coupled with the electronic device,
identify that a region of interest in the first image is changed from a first region to a second region based on the first image, wherein the first region includes at least the second region; and
in response to the identifying that the region of interest in the first image is changed from the first region to the second region, control the display to display at least a portion of the second image corresponding to the second region by enlarging at least the portion of the second image corresponding to the second region.

2. The electronic device of claim 1, wherein the at least one processor is further configured to:
identify that a specific portion of the first image is selected; and
associate the specific portion of the first image with the region of interest when the specific portion of the first image is selected.

3. The electronic device of claim 1, wherein the at least one processor is further configured to:
identify a plurality of feature points in the second image;
select one or more feature points from the plurality of feature points that correspond to the region of interest; and
identify the portion of the second image corresponding to the second region, based on the selected one or more feature points.

4. The electronic device of claim 1, wherein the at least one processor is further configured to execute at least one of:
identifying a size of the portion of the second image corresponding to the second region when a size of the first region of interest is changed; or
identifying a location of the portion of the second image corresponding to the second region when a location of the first region of interest is changed.

5. The electronic device of claim 1, wherein the at least one processor is further configured to control the display to display at least the portion of the second image corresponding to the second region concurrently with the image in the second region, such that the change of the region of interest and the portion of the second image corresponding to the second region become visible on the display at substantially the same time.

6. The electronic device of claim 1, wherein the at least one processor is further configured to:
compare the second region and the portion of the second image corresponding to the second region;
display a first indication of a result of the comparison on the display, and
transmit the result of the comparison to the external electronic device.

7. A method for use in an electronic device, comprising:
receiving, from an external electronic device, a first image;
acquiring a second image by using a camera operably coupled with the electronic device;
identifying that a region of interest in the first image is changed from a first region to a second region based on the first image, wherein the first region includes at least the second region; and
in response to the identifying that the region of interest in the first image is change from the first region to the second region, controlling a display of the electronic device to display at least a portion of the second image corresponding to the second region by enlarging at least the portion of the second image corresponding to the second region.

8. The method of claim 7, further comprising:
receiving, from the external electronic device, metadata corresponding to the first image,
wherein the metadata includes a plurality of feature points corresponding to the first image, further comprising:
associating a first portion of the first image with the first region of interest when the metadata includes a first metadata; and
associating a second portion of the first image with the first region of interest when the metadata includes a second metadata.

9. The method of claim 7, wherein the displaying of at least the portion of the second image comprises:
controlling the display to display the at least the portion of the second image concurrently with the first image in the second region, such that the change of the region of interest and the portion of the second image corresponding to the second region become visible on the display at substantially the same time.

10. The method of claim 7, further comprising:
comparing the second region and the portion of the second image corresponding to the second region;
display a first indication of a result of the comparison on the display, and
transmitting the result of the comparison to the external electronic device.

11. A non-transitory computer-readable medium storing one or more processor-executable instructions which when executed by at least one processor cause the at least one processor to perform a method comprising the steps of:
receiving, from an external electronic device, a first image;
acquiring a second image by using a camera operably coupled with an electronic device;
identifying that a region of interest in the first image is changed from a first region to a second region based on the first image, wherein the first region includes at least the second region; and
in response to the identifying that the region of interest in the first image is change from the first region to the second region, controlling a display of the electronic device at least a portion of the second image corresponding to the second region by enlarging at least the portion of the second image corresponding to the second region.

12. An electronic device, comprising:
a communication module;
a memory;
at least one processor operatively coupled to the communication module and the memory, configured to:
acquire a first image by executing a zoom operation of a camera operably coupled with the electronic device,
in response to executing of the zoom operation of the camera, identify a first region of interest in the first image;

broadcast, through the communication module, information corresponding to the first region of interest;
in response to broadcasting of the information, receive feedback information from an external electronic device through the communication module, wherein the feedback information includes information indicating whether the first image and a second image acquired by the external electronic device correspond to each other;
in response to receiving of the feedback information, generate indication information associated with the second image based on the feedback information; and
transmit, through the communication module, the indication information to the external electronic device.

13. The electronic device of claim 12, wherein the at least one processor is further configured to:
identify a plurality of feature points in the first image;
identify the first region of interest based on at least some of the plurality of feature points; and
include at least some of the plurality of feature points in the information corresponding to the first region of interest.

14. The electronic device of claim 12, wherein the at least one processor is further configured to:
control a display of the electronic device to display the indication information.

15. The electronic device of claim 12, wherein the at least one processor is further configured to display a visual effect corresponding to the feedback information in a separate window.

16. The electronic device of claim 12, wherein the at least one processor is further configured to:
change the region of interest in the first image based on a change to a second region of interest of the second image that corresponds to the first image and is received from the external electronic device.

17. A method for use in an electronic device, comprising:
acquire a first image by executing a zoom operation of a camera operably coupled with the electronic device;
in response to executing of the zoom operation of the camera, identifying a first region of interest in the first image;
broadcasting information corresponding to the first region of interest;
in response to broadcasting of the information, receiving, from an external electronic device, feedback information, wherein the feedback information includes information indicating whether the first image and a second image acquired by the external electronic device correspond to each other;
in response to receiving of the feedback information, generating indication information associated with the second image based on the feedback information; and
transmitting the indication information to the external electronic device.

18. The method of claim 17, further comprising:
identifying a plurality of feature points in the first image;
identifying the first region of interest based on at least some of the plurality feature points.

19. The method of claim 17, further comprising:
displaying a visual effect corresponding to the feedback information in a separate window.

20. A non-transitory computer-readable medium storing one or more processor-executable instructions which when executed by at least one processor cause the at least one processor to perform a method comprising the steps of:
acquire a first image by executing a zoom operation of a camera operably coupled with an electronic device;
in response to executing of the zoom operation of the camera, identifying a first region of interest associated with the first image;
broadcasting information corresponding to the first region of interest; and
in response to broadcasting of the information, receiving, from an external electronic device, feedback information, wherein the feedback information includes information indicating whether the first image and a second image acquired by the external electronic device correspond to each other,
in response to receiving of the feedback information, generating indication information associated with the second image based on the feedback information; and
transmitting the indication information to the external electronic device.

* * * * *